US008947544B2

(12) United States Patent
Kawai

(10) Patent No.: US 8,947,544 B2
(45) Date of Patent: Feb. 3, 2015

(54) IMAGE PICKUP APPARATUS THAT ALLOWS FOR SHORT-DISTANCE PHOTOGRAPHING

(75) Inventor: Sumio Kawai, Hachioji (JP)

(73) Assignee: Olympus Imaging Corp. (JP)

( * ) Notice: Subject to any disclaimer, the term of this patent is extended or adjusted under 35 U.S.C. 154(b) by 26 days.

(21) Appl. No.: 13/531,693

(22) Filed: Jun. 25, 2012

(65) Prior Publication Data

US 2013/0010137 A1 Jan. 10, 2013

(30) Foreign Application Priority Data

Jul. 7, 2011 (JP) ................................. 2011-151128

(51) Int. Cl.
*H04N 5/228* (2006.01)
*H04N 5/232* (2006.01)

(52) U.S. Cl.
CPC ....... *H04N 5/23258* (2013.01); *H04N 5/23261* (2013.01); *H04N 5/23287* (2013.01)
USPC .................................... 348/208.1; 348/222.1

(58) Field of Classification Search
CPC ...................................................... H03M 1/007
USPC ...................................................... 348/208.1
See application file for complete search history.

(56) References Cited

U.S. PATENT DOCUMENTS

| 2002/0126890 A1* | 9/2002 | Katayama et al. ............ 382/154 |
| 2007/0140678 A1* | 6/2007 | Yost et al. .................... 396/147 |
| 2007/0280662 A1* | 12/2007 | Endo .............................. 396/67 |
| 2009/0009651 A1* | 1/2009 | Takayanagi ................... 348/345 |
| 2010/0033677 A1* | 2/2010 | Jelinek ......................... 351/208 |
| 2010/0141734 A1* | 6/2010 | Tani et al. ..................... 348/36 |
| 2011/0058085 A1* | 3/2011 | Ito et al. .................. 348/333.02 |
| 2012/0105699 A1* | 5/2012 | Takasumi ................ 348/333.01 |
| 2013/0002928 A1* | 1/2013 | Imai ......................... 348/333.11 |
| 2014/0022346 A1* | 1/2014 | Liu et al. ......................... 348/46 |

FOREIGN PATENT DOCUMENTS

| JP | 62-011836 | 1/1987 |
| JP | 2005-037902 | 2/2005 |
| JP | 2011-077764 | 4/2011 |

* cited by examiner

*Primary Examiner* — Roberto Velez
*Assistant Examiner* — Cynthia Segura
(74) *Attorney, Agent, or Firm* — Volpe and Koenig, P.C.

(57) ABSTRACT

A photographing apparatus includes: a taking lens including a movable focusing lens; an image pickup portion that converts an optical image obtained via the taking lens into an image signal; a movement determining portion that determines movement of the photographing apparatus in an optical axis direction of the taking lens; and a recording portion that continuously records therein a plurality of images obtained by the image pickup portion with the focusing lens being set to a fixed position so that the taking lens is at a predetermined focused position as the photographing apparatus moves in the optical axis direction of the taking lens.

6 Claims, 18 Drawing Sheets

FIG.14
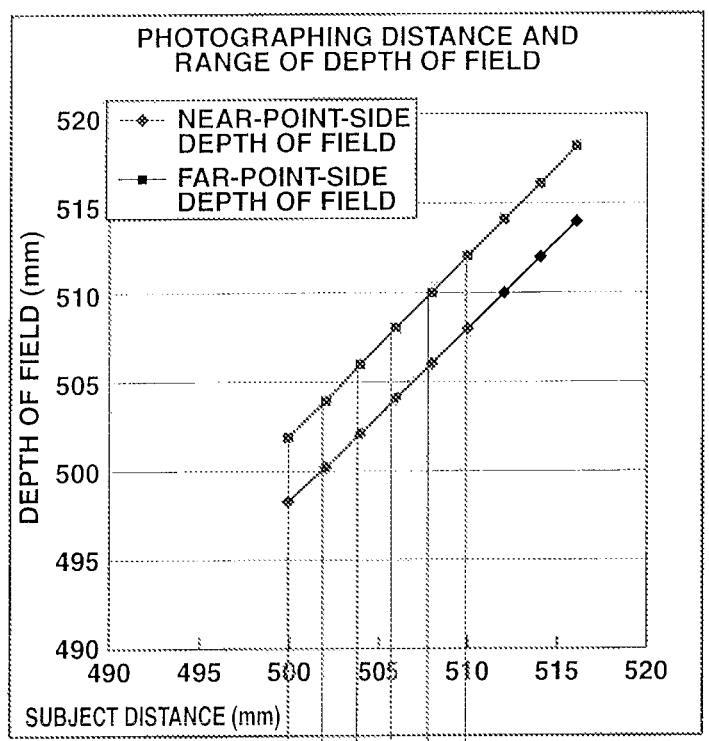
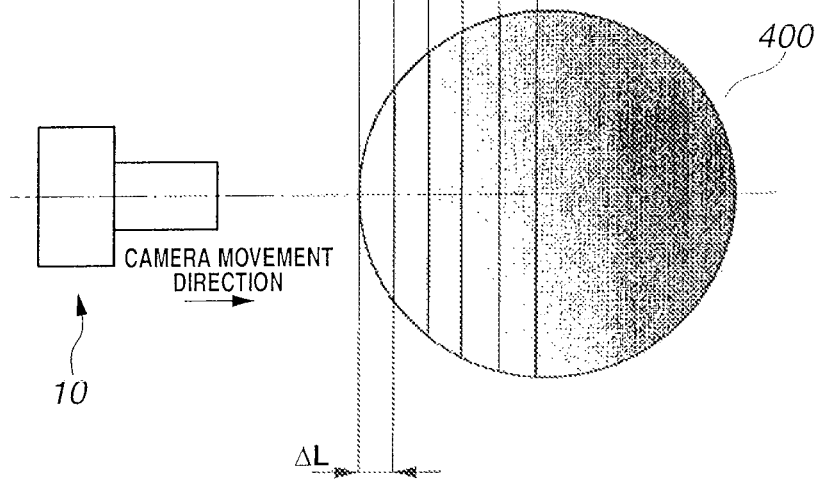

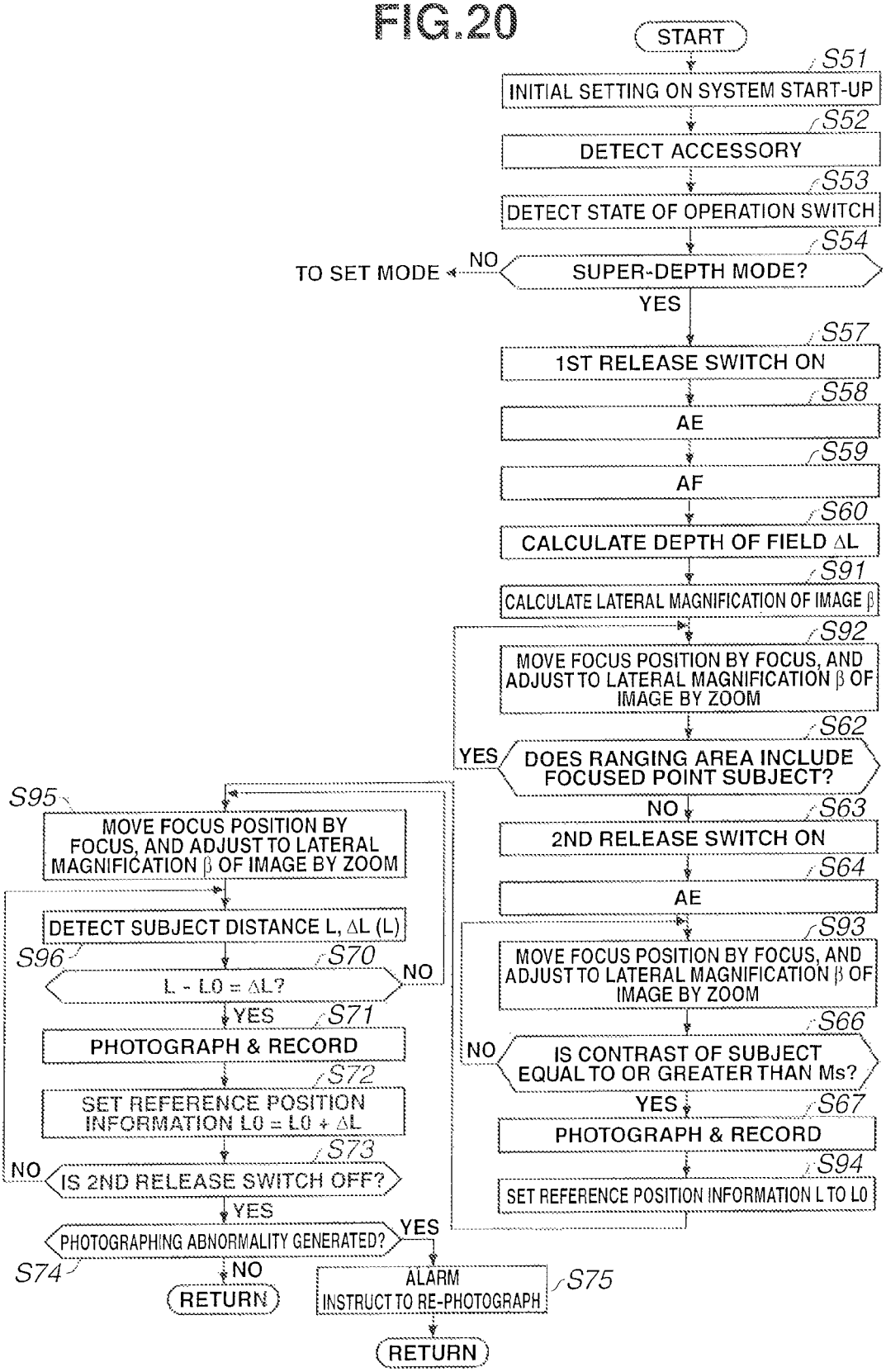

IMAGE PICKUP APPARATUS THAT ALLOWS FOR SHORT-DISTANCE PHOTOGRAPHING

CROSS REFERENCE TO RELATED APPLICATION

This application claims benefit of Japanese Application No. 2011-151128 filed on Jul. 7, 2011, the contents of which are incorporated by this reference.

BACKGROUND OF THE INVENTION

1. Field of the Invention

The present invention relates to a photographing apparatus with a taking lens that allows for short-distance photographing.

2. Description of the Related Art

In recent years, digital cameras as photographing apparatuses which can photograph high-quality still images have been commercially available. However, in a case where a subject within a short distance is photographed with a taking lens used for such a camera, since a depth of field is shallow, even if focusing is performed on a target part, it is impossible to obtain an image in which an overall view of a subject to be photographed is in focus. In particular, in a case of short-distance photographing, a subject which a photographer wants to photograph is obvious, so that a high-quality image in which an overall subject is in focus has been required.

For example, a camera disclosed in Japanese Patent Application Laid-Open Publication No. 62-11836 fixes an optical system, which is a taking lens, with respect to a subject, photographs a plurality of images with a position of an image pickup device being changed with respect to the optical system, and combines the plurality of images to obtain an image with large depth of focus.

The camera in Japanese Patent Application Laid-Open Publication No. 62-11836 changes a position of the image pickup device with respect to the optical system, which is a taking lens, photographs a plurality of images with a focal position to a three-dimensional subject being changed, and combines the images to obtain an image with large depth of focus.

SUMMARY OF THE INVENTION

A photographing apparatus according to an aspect of the present invention includes: a taking lens including a movable focusing lens; an image pickup portion that converts an optical image obtained via the taking lens into an image signal; a movement determining portion that determines movement of the photographing apparatus in an optical axis direction of the taking lens; and a recording portion that continuously records therein a plurality of images obtained by the image pickup portion with the focusing lens being fixed and with the taking lens being set to a predetermined focused position with respect to movement of the photographing apparatus in the optical axis direction.

Also, a photographing apparatus according to another aspect of the present invention includes: an image pickup portion that converts an optical image of a subject formed by a taking lens into an electronic image; a focused position setting portion that sets a focused position of the optical image; a detecting portion that detects a movement amount of the focused position when the photographing apparatus moves in substantially an optical axis direction of the taking lens with image magnification maintained constant and with the focused position being held, the position being set by the focused position setting portion; and a recording portion that records therein a plurality of images photographed each time the detecting portion detects movement of the focused position by a predetermined amount within a range of a depth of field.

BRIEF DESCRIPTION OF THE DRAWINGS

FIG. 14 is a diagram illustrating a relationship between a position of the camera system according to the second embodiment and depth of field;

FIG. 20 is a flow chart explaining details of a photographing operation of a camera system according to a modification of the second embodiment.

DETAILED DESCRIPTION OF THE PREFERRED EMBODIMENTS

Now, a photographing apparatus of the present invention will be described with reference to the drawings. The camera system described in the present embodiment mounts a driving apparatus for correcting a camera shake of an image pickup unit including an image pickup device which obtains an image signal by photoelectric conversion, and a driving apparatus for detecting a focused point.

The following embodiments will describe an application to a single-lens electronic camera (digital camera) with an interchangeable lens. It should be noted that the present invention is not limited to the respective embodiments hereinafter described, and a variety of changes are possible without departing from the gist of the present invention.

(First Embodiment)

Figure 1:
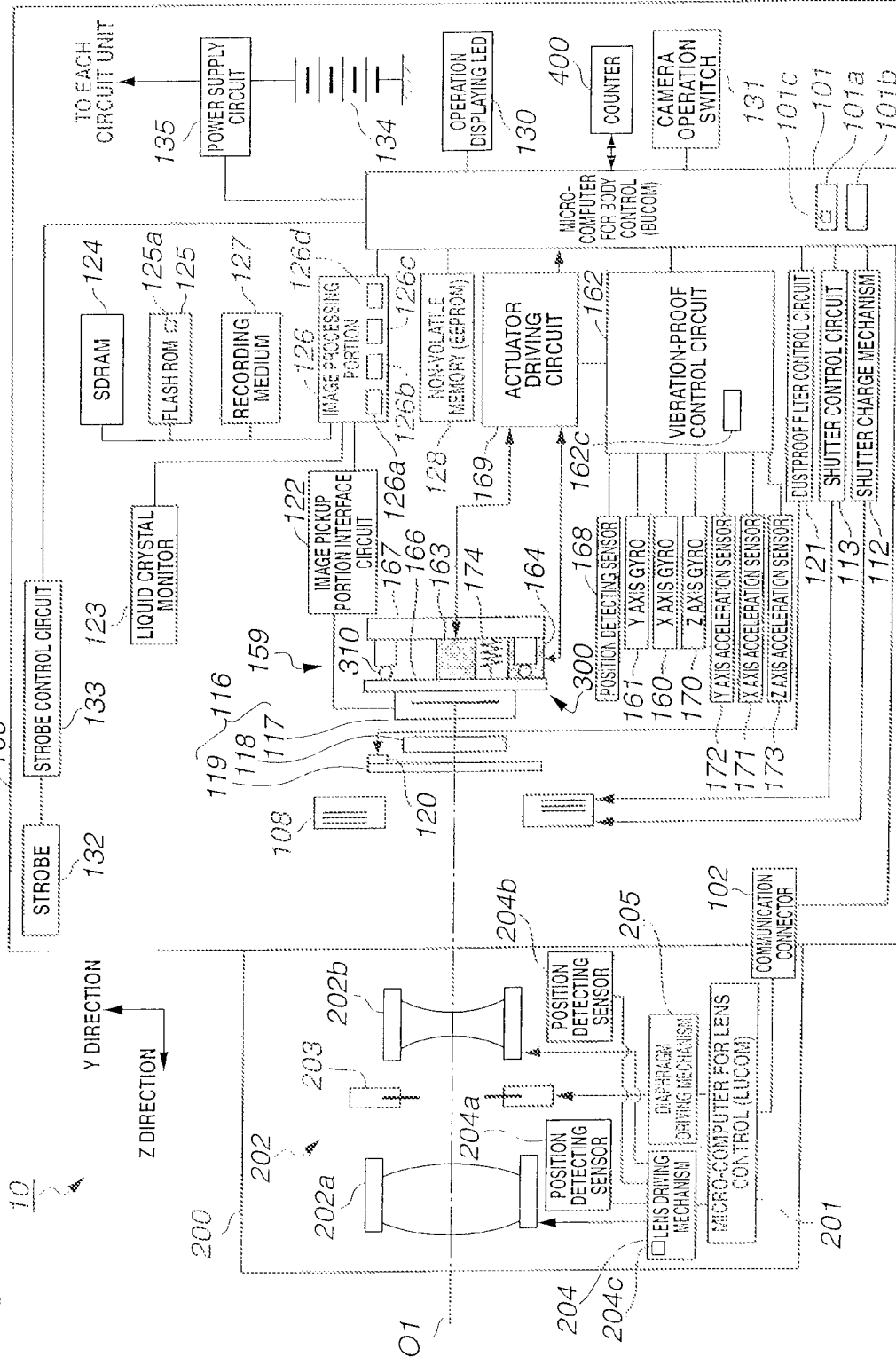
FIG. 1 is a block diagram schematically illustrating an electrical system configuration of a camera system according to a first embodiment of a photographing apparatus of the present invention.

As shown in FIG. 1, a camera system 10 of the present embodiment includes a lens unit 200 that is a taking lens and a body unit 100.

The camera system 10 of the present embodiment, which is a photographing apparatus, includes the lens unit 200 having a taking lens for forming an optical image of a subject and a body unit 200 having an image pickup unit 116 with an image pickup portion 117 including, for example, an image pickup device referred to as a charge coupled device (CCD) or a CMOS sensor.

Hereinafter, a direction from the body unit 100 to a subject is called "forward," and the opposite direction is called "backward." Also, an axis that agrees with an optical axis 01 of an optical system composing the taking lens in the lens unit 200 is defined as a Z axis, and two axes orthogonal to each other in a plane orthogonal to the Z axis are defined as an the X axis (an axis in a horizontal direction) and a Y axis (an axis in a vertical direction).

First, a detailed configuration of the camera system 10 will be described.

As shown in FIG. 1, in order to form an optical image of a subject, a taking lens 202 is installed in the lens unit 200. At an image formation position of the taking lens 202, the image pickup portion 117 is installed, which is composed of, for example, an image pickup device that performs photoelectric conversion of an optical image, such as a charge coupled device (CCD) or a CMOS sensor. In this manner, the camera system 10 is composed.

Also, the camera system 10 includes the body unit 100 having the image pickup portion 117 as well as the lens unit 200 detachably mounted on the body unit 100 and having the taking lens 202.

In the present embodiment, an operation of the lens unit 200 is controlled by a micro-computer for lens control (hereinafter, referred to as the "Lucom") 201 as control means at a side of the lens unit, disposed in the lens unit 200.

Also, an operation of the body unit 100 is controlled by a micro-computer for body control (hereinafter, referred to as the "Bucom") 101 as control means disposed in the body unit 100 and controlling the entire camera system 10. The Bucom 101 has a function of a control portion 101a as control means of a photographing operation including macro continuous photographing described later (in a second embodiment, super-depth photographing).

With the lens unit 200 mounted on the body unit 100, the Bucom 101 is electrically connected to the Lucom 201 so that they can communicate with each other via a communication connector 102. The Lucom 201 is configured to cooperate with the Bucom 101 in a subordinate manner. Also, via the communication connector 102, electric power required for each unit is supplied from a power supply circuit 135 set up in the body unit 100.

The taking lens 202 includes a focus lens 202a as a focusing lens, the position of which can be changed in an optical axis direction (the Z axis direction), and a variable power lens 202b that changes magnification with a changing position. Both the lenses are held in the lens unit 200.

Also, the taking lens 202 performs focusing by operating the focus lens 202a in the optical axis direction and performs zooming that changes image magnification with a focus position substantially constant by moving a position of the variable power lens 202b in the optical axis direction. The zooming may also operate both the focus lens 202a and the variable power lens 202b.

Both the lenses 202a and 202b may be a single lens or a plurality of lenses, of course.

In the lens unit 200, an attaching/detaching mechanism is formed which provides attaching/detaching via a body mount being not shown and provided at a front side (a subject side) of the body unit 100 and a lens mount being not shown and provided at a rear side (image pickup device side) of the lens unit 200.

The attaching/detaching mechanism adopts bayonet-type connection, for example. This configuration allows the camera system 10 to exchange the lens unit 200 for various sorts of lens units 200 to be mounted having different characteristics, and then perform photographing. For example, a lens for macro photographing which enables photographing at high image magnification may be used, or a so-called middle ring that is mounted between the lens unit 200 and the body unit 100 to enable photographing at higher image magnification may be mounted.

Also, a diaphragm 203 is disposed on the lens unit 200. The diaphragm 203 is driven by an actuator such as a stepping motor, not shown, that is provided in a diaphragm driving mechanism 205.

On the other hand, the focus lens 202a and the variable power lens 202b are driven by an actuator such as a stepping motor, not shown, that is provided in a lens driving mechanism 204. Positions of the focus lens 202a and the variable power lens 202b of the taking lens 202 are detected by position detecting sensors 204a and 204b, respectively and inputted into the Lucom 201.

Further, information on a focused distance, a focal length, and a diaphragm value calculated from the positions of the focus lens 202a and the variable power lens 202b and information on the lens unit 200 such as depth of field calculated from a diaphragm value, a focused distance, and a focal length are inputted into the Bucom 101 via the communication connector 102.

It is noted that the position detecting sensors 204a and 204b may be any sensor which can accurately detect a position, such as one sensor that detects electrical resistance changing with the changes of a position, another sensor that detects a magnetic pattern magnetized to become a magnetic substance by a Hall element or a GMR (giant magneto-resistance) element, or still another sensor that detects an optical pattern with a light emitting element and a light receiving element.

As described later, the image pickup portion 117 is held in the body unit 100 via an image pickup portion moving mechanism portion 159 that moves the image pickup portion 117. The image pickup portion 117 is, as described above, composed of an image pickup device having a function to perform photoelectric conversion, such as a CCD or a CMOS sensor.

In the present embodiment, the image pickup unit 116 includes an optical filter 118 and a dustproof filter 119 such as a low-pass filter, disposed in front of the image pickup portion 117. A piezoelectric element 120 is fit to a peripheral edge of the dustproof filter 119.

The piezoelectric element 120 is configured to vibrate the dustproof filter 119 through a dustproof filter control circuit 121 at a predetermined frequency determined by dimensions and material. The vibrations of the piezoelectric element 120 can remove dust on the dustproof filter 119.

In front of the dustproof filter 119, a shutter 108 having a structure generally called "focal-plane shutter" is disposed. Also, in the body unit 100, a shutter charge mechanism 112 for charging a spring that drives a leading curtain and a trailing curtain of the shutter 108 and a shutter control circuit 113 for controlling movements of the leading curtain and the trailing curtain are provided.

Noted that the optical filter 118, the dustproof filter 119, and the shutter 108 are disposed as needed, and the camera system 10 may not include them.

The image pickup portion 117 is electrically connected to an image processing portion 126 via an image pickup portion interface circuit 122 for controlling an operation of the image pickup portion 117. The image processing portion 126 has a function for, based on signals photoelectrically converted and outputted by the image pickup portion 117, generating an image (signals) to be displayed on a display portion and an image to be recorded in a recording portion.

The image processing portion 126 is configured to use a storage area such as an SDRAM 124 or a Flash ROM 125 to perform predetermined image processing on an image.

In order to perform autofocus using a so-called contrast detection scheme, the image processing portion 126 calculates a contrast value in a predetermined region (a focus area) for a plurality of images generated by vibrating (i.e., wobbling movements) the focus lens 202a or the image pickup portion 117 in the optical axis direction at a predetermined amplitude to detect at which of a far side or a near side a focus position is.

Then, the image processing portion 126 captures (photographs) images while moving the focus lens 202a in a direction in which the lens being wobbled focuses, thereby enabling the detection of a maximum contrast state in the images as a focus position. The image processing portion 126 stops the focus lens 202a at the focus position, whereby autofocus (AF) is performed with the taking lens 202.

In this manner, the image processing portion 126 includes a focus position detecting portion or a focused position detecting portion 126a that detects a state of a maximum contrast as a focus position or a focused position (of the taking lens 202). Also, the Bucom 101 has a function of a focused position setting portion 101b that sets the taking lens 202 to a focused position in response to a detection signal of the focused position detecting portion 126a.

In a state where a release switch is pressed halfway down, i.e., a first switch (1st switch) is held ON, autofocus is performed, and the focus lens 202a, the variable power lens 202b, and the image pickup portion 117 are maintained at their current positions. Then, an image magnification of a focused position becomes substantially constant, and a plurality of images are photographed in a substantially continuous manner with positions of the subject and the image pickup portion 117 being changed. The photographed images are recorded in a recording medium 127 that is a recording portion.

The image processing portion 126 is electrically connected with a liquid crystal monitor 123 composing a display portion disposed on a back of the body unit 100 and can display on the liquid crystal monitor 123 an image from the image pickup portion 117 (as a through-the-lens image).

Also, the image processing portion 126 has a function of an image combining portion 126b that cuts out, from the plurality of images recorded in the recording medium 127, image regions (image areas) having a predetermined contrast and combines the regions to generate one composite image.

The liquid crystal monitor 123 forming a display portion also functions as an electronic viewfinder that displays a state of photographing composition of the camera system 10 in real time. Also, the present embodiment does not have an optical finder, but an optical finder of a single-lens reflex type may be provided.

Using the finders, at the time of macro continuous photographing (macro continuous shooting) or super-depth photographing, the photographer (user) can check whether a subject is in focus and check display of an alarm that informs the user of a photographing abnormality.

Also, as described later, the liquid crystal monitor 123 is used to display a menu, a photographing mode, and a guide for, after a position of the focus lens 202a being a focusing lens is fixed in macro continuous shooting, moving the camera system 10, which is a photographing apparatus.

The recording medium 127 composing a recording portion is a recording medium such as a flash memory and a hard disk drive (HDD), and is detachably provided in the body unit 100. In the recording medium 127, data of an image and the like (in the case of video, voice is also included) picked up by the camera system 10 are recorded.

A non-volatile memory 128 is a storage portion including, for example, an EEPROM in which predetermined control parameters required to control the camera system 10 are stored. The non-volatile memory 128 is provided so as to be accessed by the Bucom 101.

The Bucom 101 is connected with an operation displaying LED (or an operation displaying LCD) 130 for outputting and displaying an operation state of the camera system 10 to the user, a camera operation switches 131, and a strobe control circuit 133 that drives an incorporated strobe 132 and an external strobe, not shown.

Figure 6:
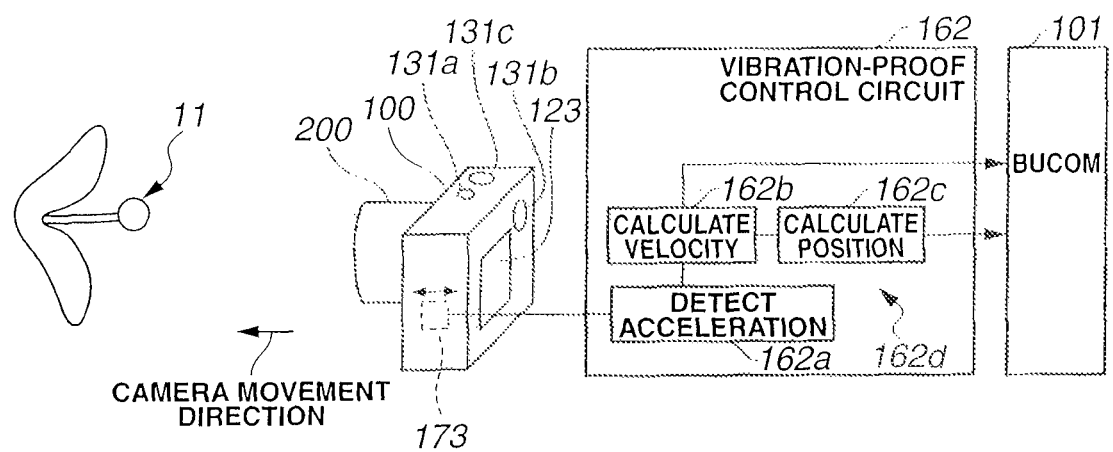
FIG. 6 is a diagram illustrating a movement determining portion and the like in the first embodiment.
Figure 11:
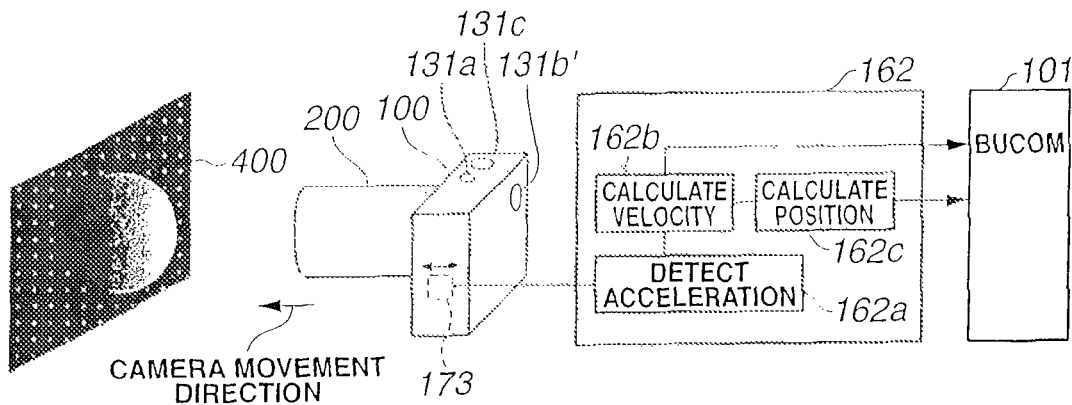
FIG. 11 is a schematic diagram illustrating a position calculating circuit and the like composing a detecting portion in a camera system according to a second embodiment of the present invention.

The camera operation switch 131 includes, as shown in FIG. 6, for example, a switch group including operation buttons required to operate the camera system 10, such as a release switch 131c, a power supply switch (a power switch) 131a, and a menu button a (menu switch) 131b, and a mode switch 131b' in FIG. 11 as a substitute for the menu button 131b in FIG. 6.

Further, in the body unit 100, a battery 134 as a power supply and the power supply circuit 135 are provided; the power supply circuit 135 converts voltage from the battery 134 into voltage required for each circuit unit composing the camera system 10 and supplies the units with the voltage. Also, a voltage detecting circuit (not shown) is provided which senses voltage variations occurring when current is supplied from an external power supply via a jack, not shown.

Next, the image pickup portion moving mechanism portion 159 will be described. The portion 159 includes a driving apparatus 300 used as a camera shake correcting function of the camera system 10 according to the present embodiment.

The camera system 10 of the present embodiment includes the image pickup portion moving mechanism portion 159 configured to allow the image pickup portion 117 to move in the X axis direction, the Y axis direction, and a direction of rotation around the Z axis in order to correct a camera shake (camera shaking). Because the camera system 10 holds the image pickup portion 117 via the image pickup portion moving mechanism portion 159, the camera system 10 of the present embodiment can mechanically move the image pickup portion 117 in the X axis direction, the Y axis direction, and the direction of rotation around the Z axis so as to correct a camera shake.

Also, the driving apparatus 300 for correcting a camera shake, composing the image pickup portion moving mechanism portion 159, uses an X axis actuator 163 and a Y axis actuator 164 as driving sources and has a moving frame 166 (a holder 145) mounting the image pickup unit 116 including the image pickup portion 117, as a moving object.

Specifically, the image pickup portion moving mechanism portion 159 includes an X axis gyro 160, a Y axis gyro 161, a Z axis gyro 170, an X axis acceleration sensor 171, a Y axis acceleration sensor 172, a Z axis acceleration sensor 173, a vibration-proof control circuit 162, the X axis actuator 163, the Y axis actuator 164, the moving frame 166, a frame 167 that is a fixed frame, a position detecting sensor 168, and an actuator driving circuit 169.

The moving frame 166 is supported by being pressed on the frame 167 by a plurality of springs 174 through a plurality of balls 310 (310a to 310c in FIGS. 2, and 310b in FIG. 4), and can move freely in the XY plane directions. The springs 174 are helical extension springs in FIG. 1, but any form of mechanism that presses the moving frame 166 on the frame 167 may be used, such as helical compression springs, plate springs, and magnetic springs.

Next, the driving apparatus 300 according to the present embodiment, using an electromagnetic VCM motor as a driving source, will be described with reference to FIGS. 2 to 5B.

Figure 2:
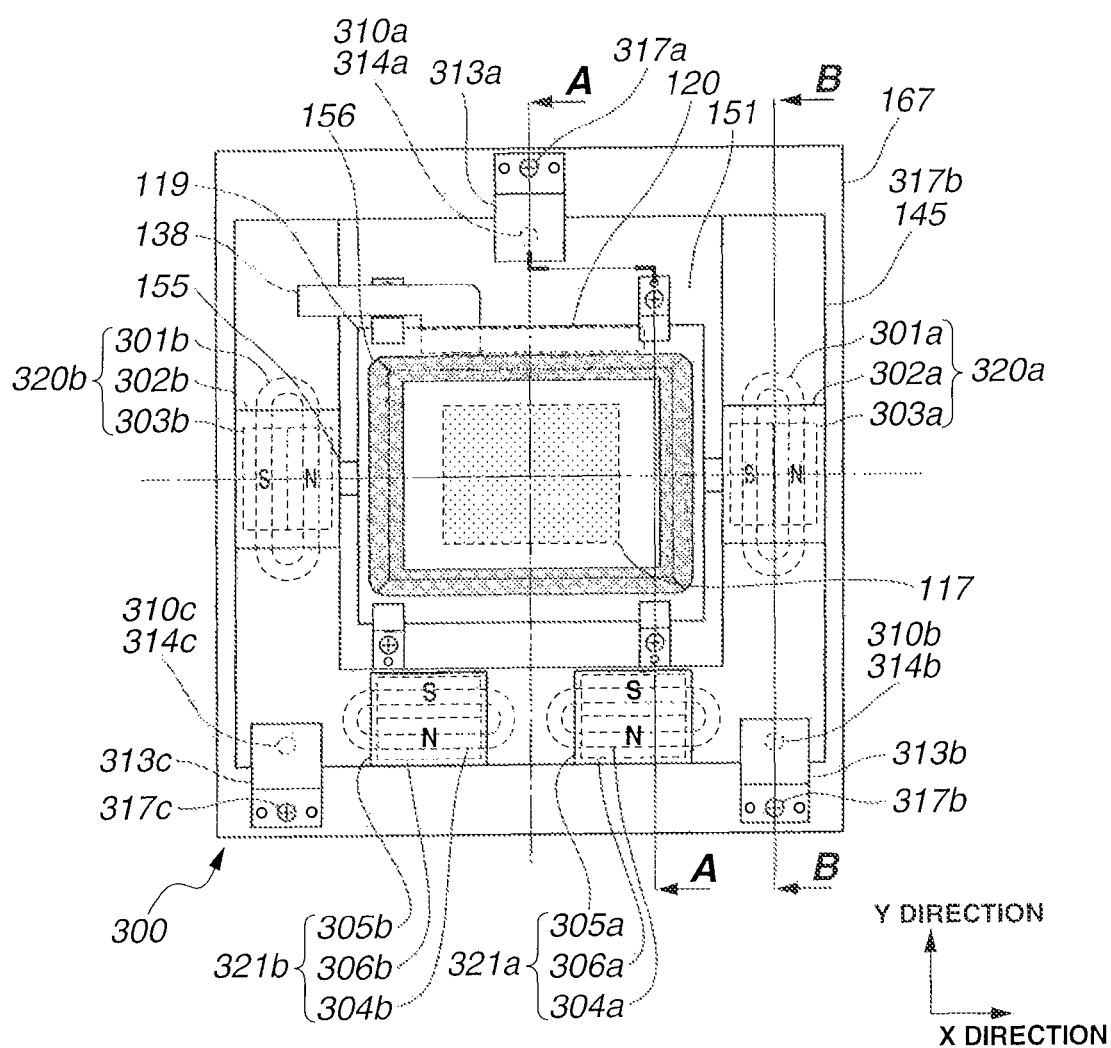
FIG. 2 is a schematic front view of an image pickup portion moving mechanism portion.
Figure 3:
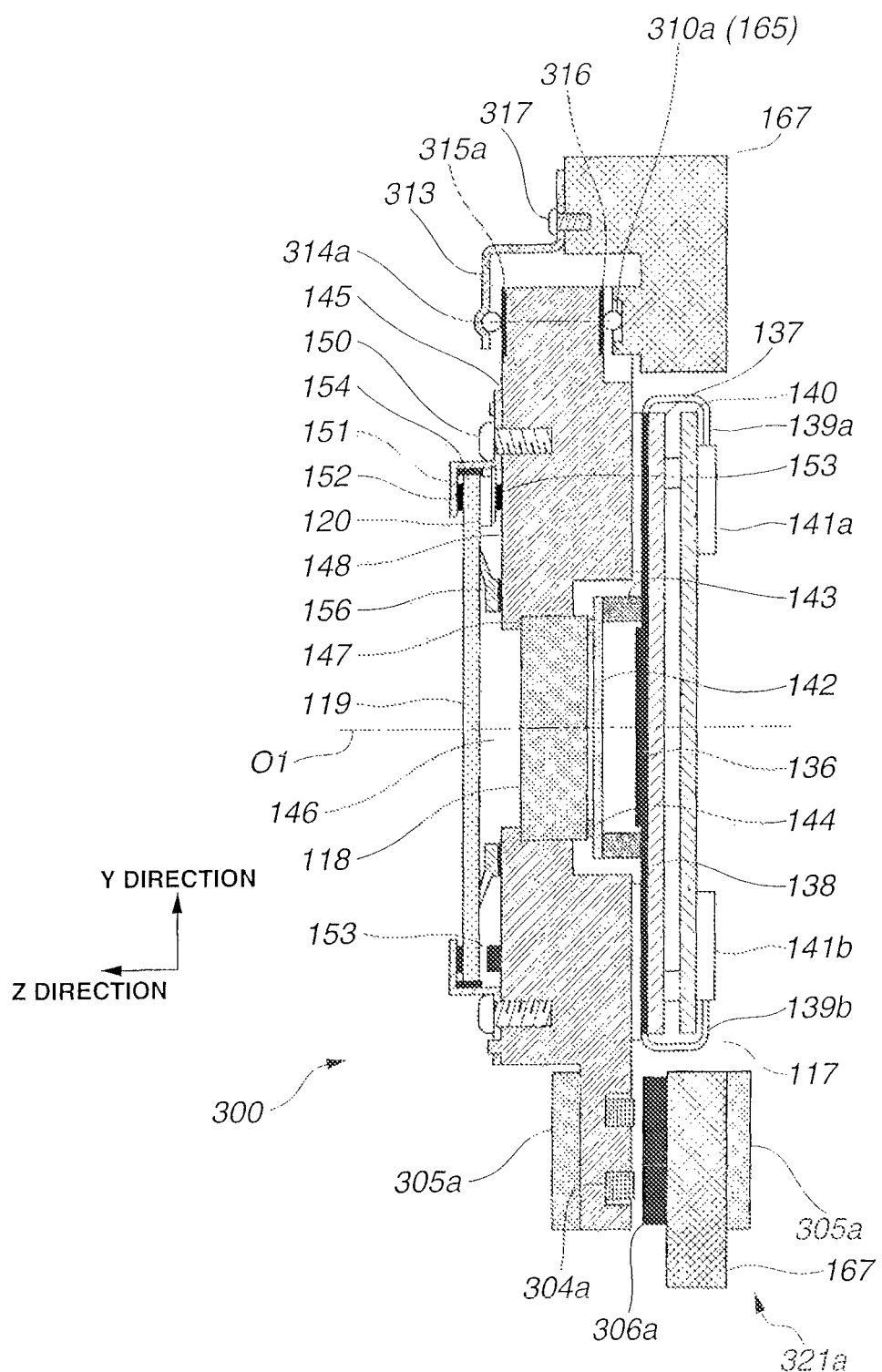
FIG. 3 is a longitudinal cross-sectional side view of a primary part of the image pickup portion moving mechanism portion taken along line A-A in FIG. 2.
Figure 4:
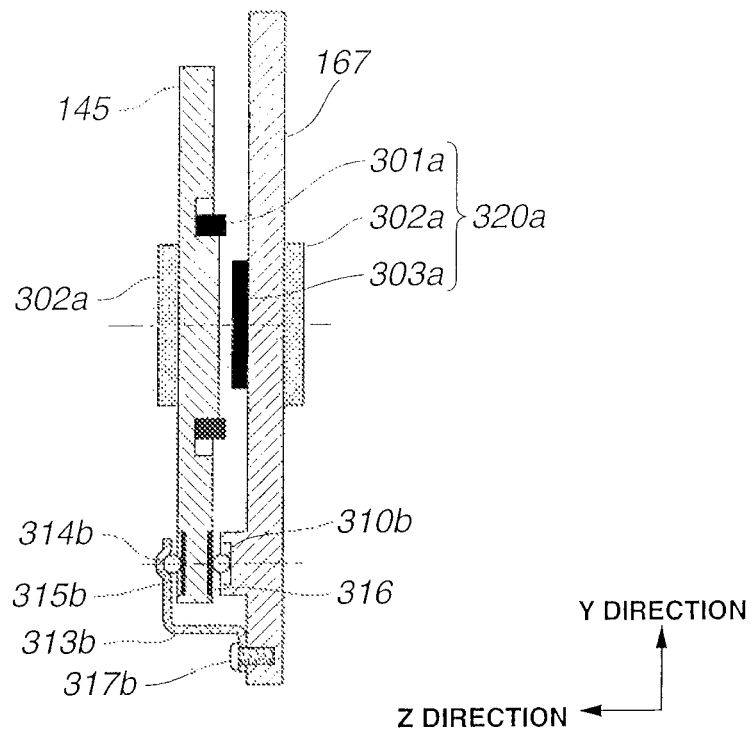
FIG. 4 is a longitudinal cross-sectional side view of the primary part of the image pickup portion moving mechanism portion taken along line B-B in FIG. 2.
Figure 5A:
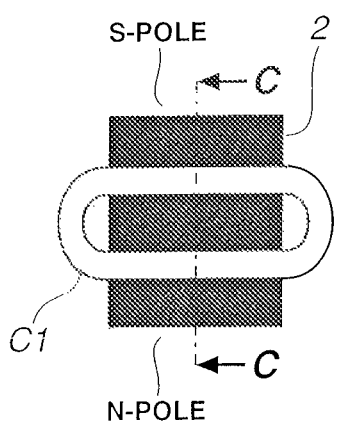
FIG. 5A is a partial front view showing a primary part structure of a voice coil motor (VCM)
Figure 5B:
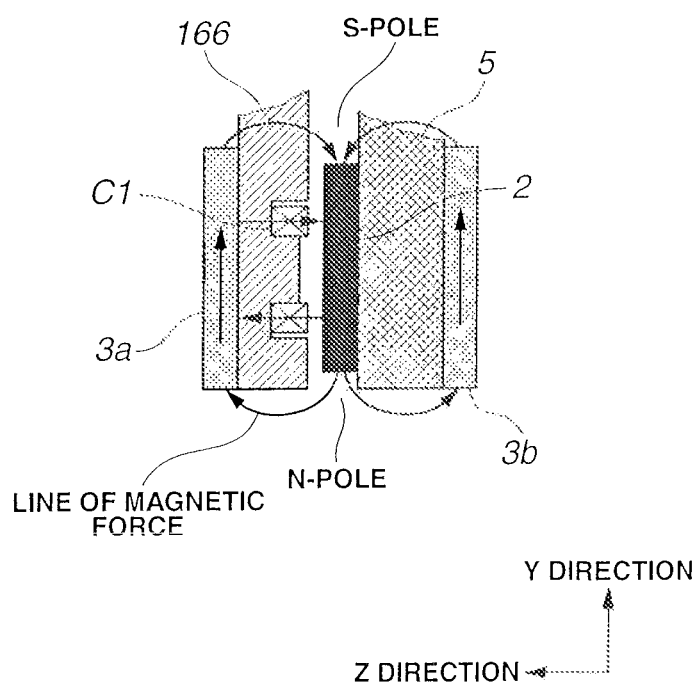
FIG. 5B is a partial longitudinal cross-sectional side view taken along line C-C in FIG. 5A.

FIG. 2 is a schematic front view showing a configuration example of the driving apparatus 300 according to the present embodiment, and FIG. 3 is a cross-sectional side view taken along line A-A of the driving apparatus 300 in FIG. 2 and seen from a side. FIG. 4 is a cross-sectional side view taken along line B-B of the driving apparatus 300 in FIG. 2 and seen from a side. FIG. 5A is a front view showing a schematic configuration of one VCM portion in FIG. 2 (e.g., lower left one in FIG. 2), and FIG. 5B is a cross-sectional side view taken along line C-C in FIG. 5A and seen from a side.

The frame 167, which is a fixed frame, is fixed to the body unit 100. The holder 145 (being the moving frame 166) that holds the image pickup portion 117 is supported by the frame 167 so as to be movable in the X axis direction, the Y axis direction, and the direction of rotation around the Z axis.

The holder 145 is supported in this manner: the three balls 310a, 310b, and 310c held in the frame 167 receive slide plates B 316a, 316b, and 316c set up on the holder 145, and slide plates A 315a, 315b, and 315c set up opposite to the slide plates B 316a, 316b, 316c, disposed on the surfaces of the holder 145, are pressed by presser bar springs 313a, 313b, and 313c forming plate springs, onto the balls 310a, 310b, and 310c via balls 314a, 314b, and 314c. Note that the presser bar springs 313a, 313b, and 313c are fixed to the frame 167 with screws 317a, 317b, and 317c.

Also, the slide plate B 316c and the slide plate A 315c (not shown) are symmetrically provided with respect to the slide plate B 316b and the slide plate A 315b in FIG. 2.

The holder 145 can freely move in a direction in a plane formed by three points at which the balls 310a, 310b, and 310c are in contact with the slide plates B 316a, 316b, and 316c of the holder 145.

Now, first, the VCMs being actuators that drive the holder 145 in directions in the XY-plane will be described with FIG. 5A and FIG. 5B. FIG. 5A is a front view showing a basic configuration of a VCM (the moving frame 166 and a yoke 3a are not shown), and FIG. 5B illustrates a cross-sectional side view taken along line C-C in FIG. 5A. A coil C1 obtained by winding a conductive thin line coated and insulated into a track shape is fixed on the moving frame 166 (the holder 145) by adhesion or the like.

A plate-like magnet 2 is magnetized in the Y direction to have an N-pole at a lower side and an S-pole at an upper side in FIG. 5A and FIG. 5B, and fixed to (the frame 167 shown as) a fixed frame 5 by adhesion or the like. Also, the plate-like yokes 3a and 3b formed of magnetic materials are fixed to the moving frame 166 and the fixed frame 5 by adhesion or the like with the magnet 2 and the coil C1 sandwiched therebetween to form a closed magnetic circuit so as not to leak lines of magnetic force generated when a current flows in the magnet 2 or the coil C1.

In this state, if a current is flowed in the coil C1, since the current of two straight line portions of the coil C1 is orthogonal to lines of magnetic force of the magnet 2, and the two straight line portions of the coil C1 have opposite directions of the lines of magnetic force and also opposite directions of the current, force acts in a same direction orthogonal to the lines of magnetic force and the current, thereby driving a moving frame 166. If the direction of the current is reversed, the moving frame 166 is driven in the reverse direction. Also, force to be generated may be changed with an amount of current flowing in the coil C1. Note that the yokes 3a and 3b are not necessary if the moving frame 166 and the fixed frame 5 are formed of magnetic materials.

Next, driving of the driving apparatus 300 will be described with reference to FIGS. 2, 3, and 4. In the driving apparatus 300, a VCM-XA 320a, a VCM-XB 320b, a VCM-YA 321a, and a VCM-YB 321b which have the same configuration as that illustrated in FIG. 5A are installed in the manner shown in FIG. 3. The VCM-XA 320a and the VCM-XB 320b are VCMs that generate driving force in the X direction, and the VCM-YA 321a and the VCM-YB 321b are VCMs that generate driving force in the Y direction.

It should be noted that the coil C1, the yokes 3a and 3b, and the magnet 2 composing the VCM shown in FIG. 5A correspond to, for example, in the VCM-XA 320a in FIG. 2 of FIG. 2 to FIG. 4, a coil X 301a, a yoke X 302a (302a), and a magnet X 303a. In the VCM-XB 320b, "b" is used in place of "a" in the VCM-XA 320a.

Also, in the VCM-YA 321a, the coil C1, the yokes 3a and 3b, and the magnet 2 in FIG. 5A and the like correspond to a coil YA 304a, a yoke YA 305a (305a), and a magnet YA 306a, and in the VCM-YB 321b, "b, B" is used in place of "a, A" in the VCM-YA 321a.

Also, driving in the direction of rotation around the Z axis may be achieved by applying different driving forces (in some case, driving force in the opposite directions) to the VCM-YA 321a and the VCM-YB 321b.

Position control for the holder 145 is performed by the position detecting sensor 168 (shown in FIG. 1) for detecting a position in the X axis direction, the Y axis direction, and the direction of rotation around the Z axis of the holder 145, and by the actuator driving circuit 169 (shown in FIG. 1) for controlling the VCM-XA 320a, the VCM-XB 320b, the VCM-YA 321a, and the VCM-YB 321b.

As shown in FIG. 3, a CCD chip 136 composing the image pickup portion 117 is placed with a flexible substrate 138 at a center position on a front surface of a fixation plate 137. The flexible substrate 138 is bent with connection portions 139a and 139b toward a back surface to be electrically connected with connectors 141a and 141b on the back surface of a main circuit board 140. An image pickup surface (front surface) of the CCD chip 136 is guarded by a guard glass 142 fit through a spacer 143.

The low-pass filter (LPF) 118 is fit to a front surface of the guard glass 142 via a filter receiving member 144. The LPF 118 is held by the holder 145 provided with an opening for an outward form of the LPF 118. A front surface of the guard glass 142 is held while being positioned in contact with a step portion 147 of the holder 145.

Also, the dustproof filter 119 is installed in front of the LPF 118 and the periphery of an opening 146 therebetween is sealed by a sealing material 156.

The dustproof filter 119 is held onto the holder 145 by bolts 150 with the piezoelectric element 120 installed between receiving members 152 and 153, with both surfaces of the filter 119 being in contact with the receiving member 152 and the piezoelectric element 120, and with a front side of a pressing member 151 pressing the filter 119 backward to a side of the holder 145. It is noted that a part of the holder 145 behind (at the back of) the dustproof filter 119 forms a dustproof filter receiving portion 148 that receives the dustproof filter 119.

An operation of the image pickup portion moving mechanism portion 159 including the foregoing driving apparatus 300 will now be described. The X axis gyro 160 detects an angular velocity of rotation movement (shake) around the X axis of the camera system 10, the Y axis gyro 161 detects an angular velocity of rotation movement around the Y axis of the camera system 10, and the Z axis gyro 170 detects an angular velocity and a center position of rotation of rotation movement in the XY-plane of the camera system 10.

The X axis acceleration sensor 171 detects acceleration of the camera system 10 in the X axis direction, and the Y axis acceleration sensor 172 detects acceleration of the camera system 10 in the Y axis direction. The vibration-proof control circuit 162 operates a camera shake compensation amount from the detected angular velocity, the center position of rotation, and the acceleration of the camera system 10, and causes the driving apparatus 300 to displace or move the image pickup portion 117 to compensate the camera shake.

In this manner, to address the case in which a camera shake occurs, the image pickup portion 117 is displaced or moved so as to substantially remove an influence by the camera shake on the image pickup portion 117.

Also, the Z axis acceleration sensor 173 detects acceleration of the camera system 10, being a photographing apparatus, in the Z axis direction to output an acceleration signal. In the present embodiment, the Z axis acceleration sensor 173 has a function of a movement determining portion or a moving portion for, in response to the detection signal (acceleration signal), determining the movement of the camera system 10, being a photographing apparatus, in the Z axis direction based on acceleration variations, as described later. Note that the Z axis direction of the camera system 10 is the same as that of the optical axis O1 of the taking lens 202 (see FIG. 1).

As shown in FIG. 6, an acceleration signal in the Z axis direction detected by the Z axis acceleration sensor 173 is used by an acceleration detecting circuit 162a in the vibration-proof control circuit 162 to detect acceleration.

The acceleration is integrated by a velocity calculating circuit 162b having an integrator to calculate (operate) the velocity at which the camera system 10 moves, and further, the velocity is integrated by a position calculating circuit 162c having an integrator to calculate (operate) a position of the camera system 10.

The Z axis acceleration sensor 173, the acceleration detecting circuit 162a, and the position calculating circuit 162c compose a movement determining portion 162d or a moving portion that determines the movement of the camera system 10 in the Z axis direction. The movement determining portion 162d or the determining portion, which determines the movement of the camera system 10 in the optical axis direction (the Z axis direction), may also be considered to be composed of the position calculating circuit 162c that uses an output signal from the Z axis acceleration sensor 173.

Without using output signals from the Z axis acceleration sensor 173, the image processing portion 126 may also form a determining portion for determining, from an image signal, the movement in the Z axis direction by using a size change determining portion 126d that determines whether or not the size of an image to be photographed or a profile of a subject in an image is changed.

Note that in the second embodiment described later, the position calculating circuit 162c composes a detecting portion for detecting a movement amount of a focused position.

The velocity and the position of the camera system 10 in the Z axis direction are inputted in the Bucom 101 and used to photograph an image with high image quality and quite large depth of field, as described later.

It should be noted that in the image pickup portion moving mechanism portion 159, the VCMs are used as actuators that move the image pickup portion 117 in the present embodiment, but such actuators are not limited to VCMs, and other driving means such as a rotary motor, a linear motor, and an ultrasound motor may also be used.

The image pickup portion moving mechanism portion 159 with such a configuration has a function of a camera shaking correcting portion that adopts a so-called image pickup device shifting scheme, i.e., a function for, by moving the image pickup portion 117 depending on the movement of the camera shake of the camera system 10, reducing an influence of the image pickup portion 117 on a subject image to be photographed, the influence being caused by a camera shake.

Also, because a camera shaking correcting function of the camera shaking correcting portion corrects a shake of the camera system 10 in directions other than the Z axis direction, a movement amount in the Z axis direction can be detected with higher accuracy. Further, even if the photographer (user) carries out framing on a subject with a high image magnification, a camera shake of the camera system 10 is corrected, so that the framing is easily enabled.

In this manner, the camera system 10, being a photographing apparatus, according to the present embodiment is characterized in that the camera system 10 includes: the taking lens 202 including a movable focusing lens; the image pickup portion 117 that converts an optical image obtained via the taking lens 202 into an image signal; the Z axis acceleration sensor 173 composing the movement determining portion 162d that determines movement of the photographing apparatus in an optical axis direction of the taking lens 202; and the recording medium 127, being a recording portion that continuously records therein a plurality of images obtained by the image pickup portion 117 with the focusing lens being fixed and with the taking lens 202 being set to a predetermined focused position with respect to movement of the photographing apparatus in the optical axis direction.

Figure 7A:
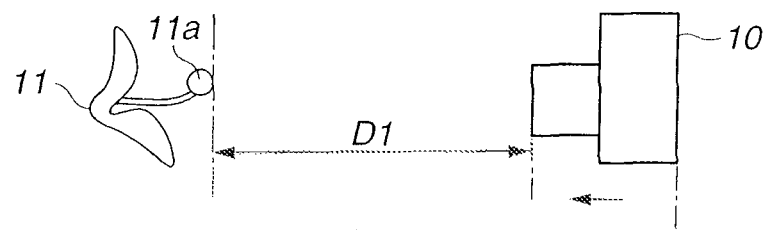
FIG. 7A to FIG. 7C are explanatory diagrams of macro continuous photographing in the first embodiment.
Figure 7B:
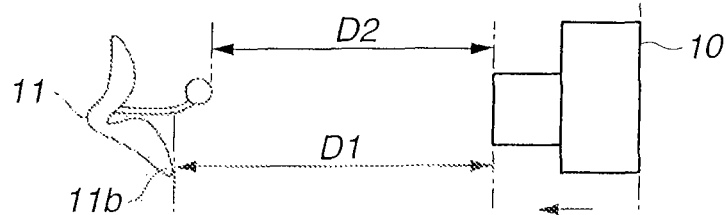
Figure 7C:
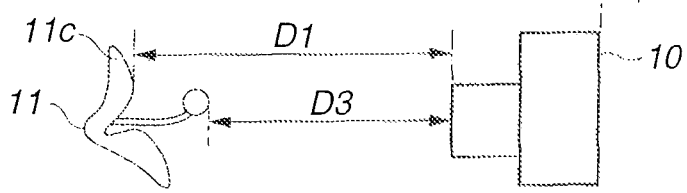
Figure 8:
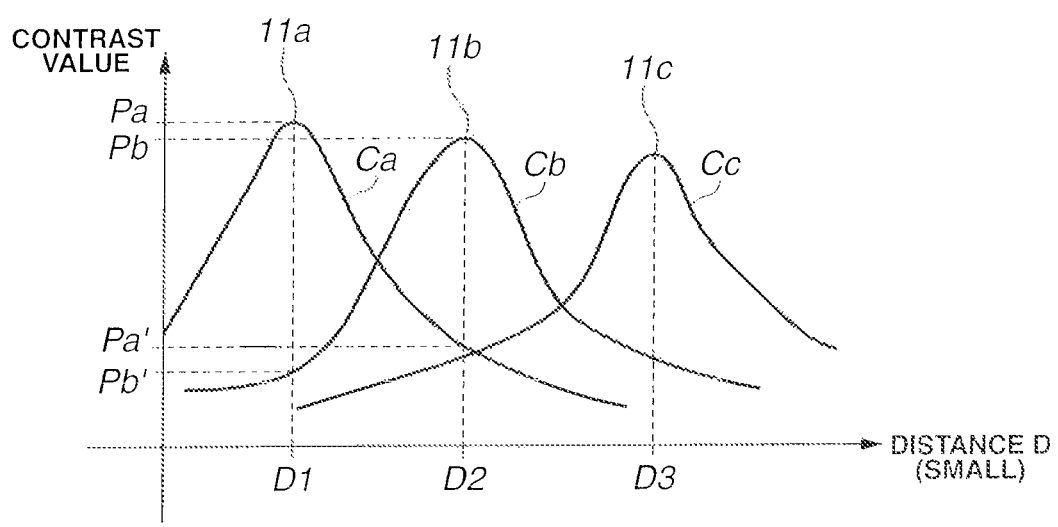
FIG. 8 is an explanatory diagram illustrating how a contrast value is changed with distance variations occurring when the camera system is brought closer to a subject in FIG. 7A to FIG. 7C.

FIG. 6 illustrates a schematic view of macro continuous photographing (macro continuous shooting) being performed on a flower 11 as a subject, with the camera system 10, FIG. 7A to FIG. 7C schematically illustrate an operation of the macro continuous shooting performed with the camera system 10 being close to the flower, and FIG. 8 illustrates how a contrast value is changed in the case of FIG. 7A to FIG. 7C.

On a top of the body unit 100, the power supply switch 131a and the release switch 131c are provided, and the menu button 131b is provided on an upper side of a back. Also, the menu button 131b can be operated to select items such as exposure correction, strobe, white balance (abbreviated as WB), and macro, as shown in FIG. 9A.

Figure 9A:
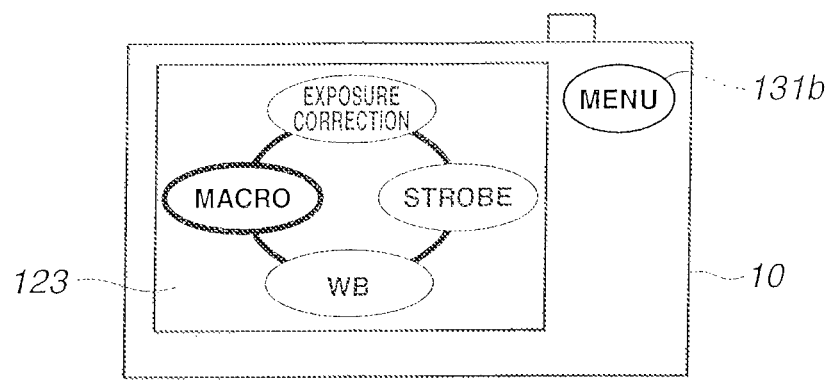
FIG. 9A to FIG. 9C are diagrams illustrating a menu operation screen.
Figure 9B:
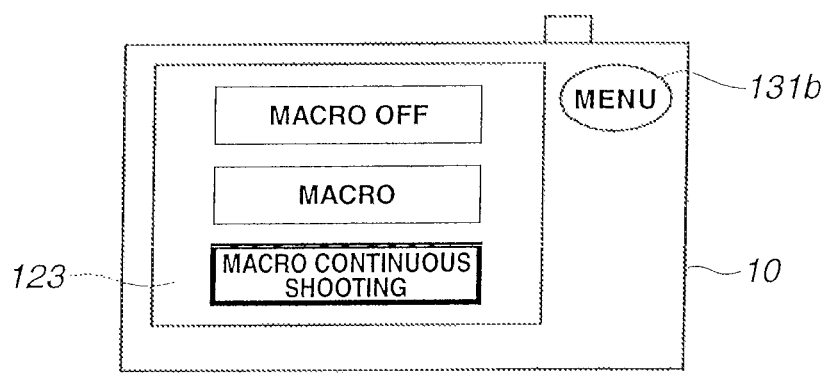

If macro continuous shooting is then performed, once macro in FIG. 9A is selected, as shown in FIG. 9B, items of macro OFF, macro, and macro continuous shooting are displayed, and macro continuous shooting can be selected to set a photographing mode of macro continuous shooting.

Also, in FIG. 6, an acceleration signal from the Z axis acceleration sensor 173 in the body unit 100 is inputted to the acceleration detecting circuit 162a, and further if the camera system 10 is moved in the Z axis direction, the position calculating circuit 162c can determine the movement.

Of course, to detect a movement position of the body unit 100 with respect to a subject, means may be used that measures a distance by emitting ultrasound and light (invisible light) from the camera to the subject and detecting the ultrasound and the light reflected from the subject.

Also, the focused position detecting portion 126a in the photographing mode of macro continuous shooting, of the image processing portion 126 in FIG. 1, detects, as a focused position, a distance with a maximum contrast value of signals in an image picked up by the image pickup portion 117 in the case where the focus lens 202a is moved in the Z axis direction (optical axis direction) at the time of first focus adjustment. The Bucom 101 for camera controlling fixes the focus lens 202a to the position and fixes the taking lens 202 to the focused position. Namely, the focused position setting portion 101b of the Bucom 101 sets (controls) the taking lens 202 to a predetermined focused position.

Then, as shown in FIG. 7A to FIG. 7C, if the user brings the camera system 10 in his/her hand closer to the flower 11, being the subject, as shown in FIG. 8, contrast values sequentially reach peaks at distances at which some parts of the flower 11 are in focus. The control portion 101a of the Bucom 101 performs control of photographing continuously at short time intervals in such a condition where contrast values sequentially reach peaks, and records a plurality of photographed images (data) in the recording medium 127, being a recording portion.

Also, the plurality of images recorded in the recording portion are superimposed on each other at a position where a maximum matching degree is achieved, and a composite image is generated.

Figure 10A:
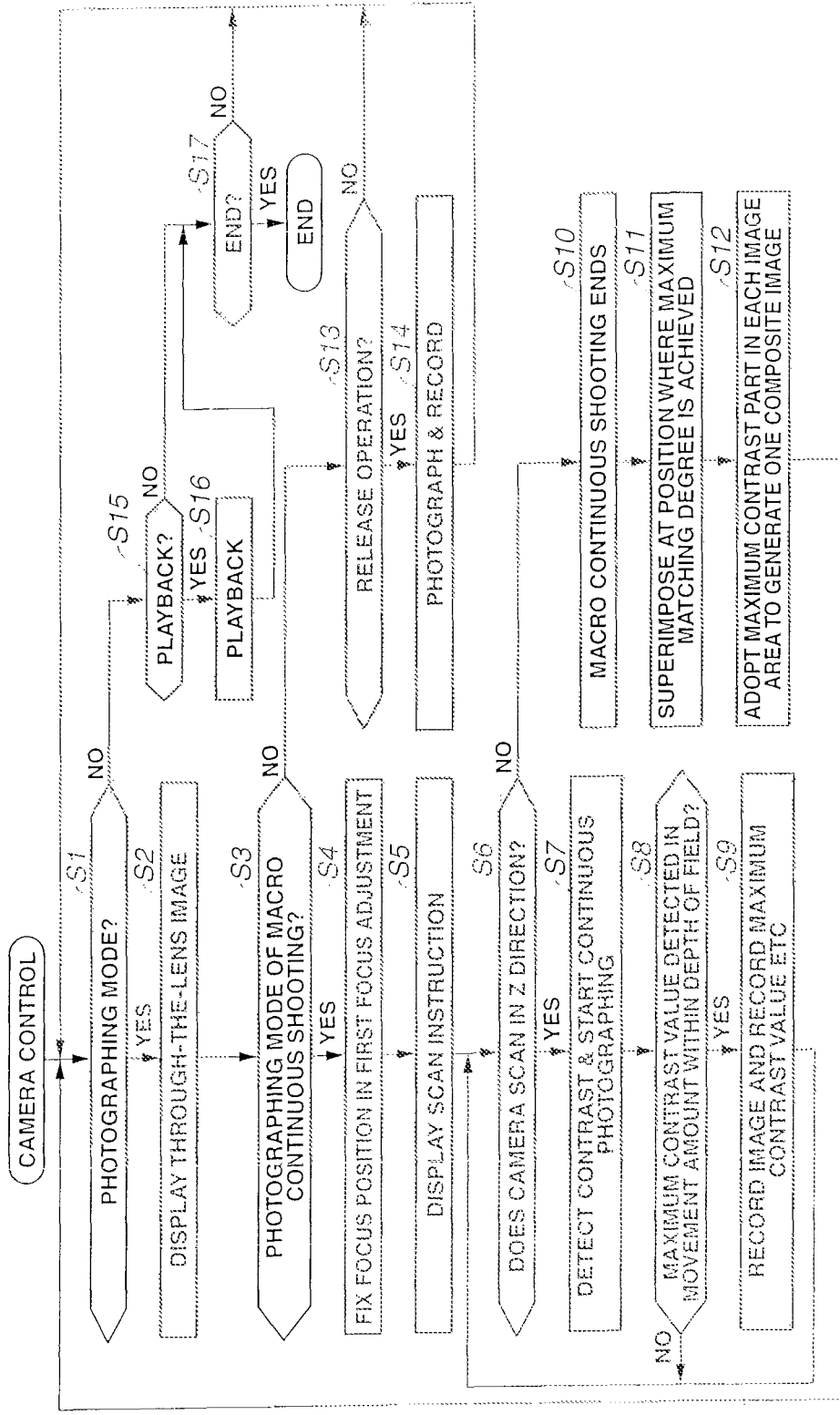
FIG. 10A is a flow chart showing an example of a processing procedure including macro continuous photographing in accordance with camera control in the first embodiment.

The Bucom 101 executes processing of the foregoing macro continuous photographing and composite image generation in accordance with a processing procedure of camera control as shown in FIG. 10A.

Now, the operation of the present embodiment will be described with reference to FIG. 10A.

Once the camera system 10 is turned on, the body unit 100 and the lens unit 200 become active, and the Bucom 101 in the body unit 100 starts camera control.

In step S1, the Bucom 101 determines whether or not the mode is photographing mode. Since an initial state of the camera system 10 is the photographing mode, in step S2, the Bucom 101 displays an image picked up by the image pickup portion 117 on the liquid crystal monitor 123 as a through-the-lens image. If in step S1 the photographer selects a playback mode, then the processing shifts to determination as to the playback mode in step S15.

Next, in step S3, the Bucom 101 determines whether or not a photographing mode of macro continuous shooting has been selected (set), and if the photographing mode of macro continuous shooting has been selected, then the processing proceeds to step S4.

In step S4, in first focus adjustment operation by the user, the Bucom 101 moves the focus lens 202a in the optical axis direction (the Z axis direction). Then, the Bucom 101 sets (fixes) the focus lens 202a to a position where a contrast value reaches a maximum, and fixes the taking lens 202 to the focus-adjusted focused position. The camera system 10 may determine, by image recognition (recognition by color or profile), the subject focus-adjusted then as the subject in macro continuous shooting, and in macro continuous shooting, the fact may be used to sense an abnormality such as a significant subject shake. As a matter of course, if a subject shake occurs, the camera system 10 or Bucom 101 instructs the photographer to carry out photographing of macro continuous shooting again, as well as the camera system 10 or Bucom 101 automatically increases the shutter speed and also sets the higher scan speed of the camera system 10 in macro continuous shooting.

The step will be explained using FIG. 7A to FIG. 7C. The first focus adjustment is performed prior to FIG. 7A (the camera system 10 is more distant from the flower 11 than in FIG. 7A). Alternatively, as explained in the second embodiment described later, in FIG. 7A and the like, after the focus is adjusted to set the lens to a predetermined focused position, once the camera system 10 is set further away from the flower 11 than in FIG. 7A, and then the camera system 10 may be brought closer to the flower 11 (to perform macro continuous shooting).

Figure 9C:
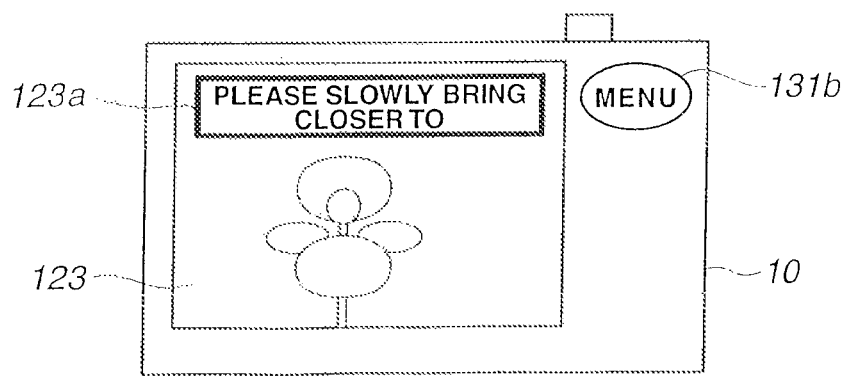

Also, in step S5, the Bucom 101 displays to the user a scan instruction that is an instruction of a movement direction and a movement velocity of the camera system 10. For example, as shown in FIG. 9C, a guide displaying portion 123a of the liquid crystal monitor 123 displays a guide meaning "please slowly bring (the camera system) closer." Also, as a guide, a speedometer like a velocity indicator of an automobile may be displayed on the guide displaying portion 123a of the liquid crystal monitor 123 and a needle for velocity indication may be held within a predetermined range of the speedometer.

The user slowly brings the camera system 10 closer to the flower 11 in accordance with the guide display of the guide displaying portion 123a. In step S6 following step S5, in response to a determination result from the velocity calculating circuit 162b and the position calculating circuit 162c about whether or not the velocity and the position have changed, the Bucom 101 determines whether or not the camera system 10 has been properly scanned (scanning) in the Z direction. It should be noted that in FIG. 10A, the camera system is abbreviated as "camera" (the same holds true for FIG. 10B and FIG. 15 described later).

In the case of a determination result that the camera system 10 has been scanned in the Z direction, in step S7, the Bucom 101 causes the image processing portion 126 to detect a contrast and starts an operation to perform macro continuous photographing. It is needless to say that the macro continuous photographing may be started using an operation signal from other operation members of the camera system 10.

Next, in step S8, the Bucom 101 determines whether or not the image processing portion 126 has detected a maximum contrast value in a movement amount within depth of field.

In an example of FIG. 10A, in the focus adjustment of step S4, depth of field in a state of a set focused position is calculated and a maximum contrast value in a movement amount within the depth of field is detected. Such detection of a maximum contrast value in a movement amount within depth of field is not restrictive, and a maximum contrast value may also be simply detected.

If the image processing portion 126 does not detect the maximum contrast value, the processing returns to step S6, and if the image processing portion 126 detects the maximum contrast value, the processing proceeds to step S9.

The step will be explained using FIG. 7A to FIG. 7C. If the camera system 10 is brought closer to the flower 11, as shown in FIG. 7A, at a distance D1 where the taking lens 202 is focused on a part 11a in the flower 11, the part being closest to the camera system 10, a contrast value reaches a peak (maximum) as shown in FIG. 8.

In the step S9, the control portion 101a of the Bucom 101 records the image in which the maximum contrast value has been detected as shown in FIG. 8, in the recording medium 127 being a recording portion, and records in the recording medium 127 the maximum contrast value in the image and information of an image area of the maximum contrast value.

After the processing in step S9, the processing returns to step S6, and the same operation will be repeated.

For example, in FIG. 7A, with the focus being adjusted at the distance D1, if the user brings the camera system 10 closer to the flower 11 up to a distance D2, as shown in FIG. 7B, a contrast value for a part 11b having the distance D1 reaches a maximum as shown in FIG. 8. Then, at a timing at which the maximum contrast value has been detected, the control portion 101a of the Bucom 101 records the image and also the maximum contrast value.

Also, if the user further brings the camera system 10 from the position in FIG. 7B to the flower 11 up to a distance D3, as shown in FIG. 7C, a contrast value for a part 11c having the distance D1 reaches a maximum as shown in FIG. 8. Then, at a timing at which the maximum contrast value has been detected, the control portion 101a of the Bucom 101 records the image in the recording medium 127 and also the maximum contrast value.

In this manner, the user can carry out the macro continuous shooting operation. Then, if the user stops the scan of the camera system 10 after bringing the camera into within the distance D1 at which the flower 11 to be photographed is in focus, then in step S6, a scan speed being equal to or lower than a predetermined value is detected; thereby it is determined that the scan is stopped, and the processing proceeds to step S10.

In step S10, the Bucom 101 ends the control operation for macro continuous shooting. Also, the stop of scan may be determined by output signals from the position calculating circuit 162c indicating that the camera system 10 remains within a predetermined area for a predetermined time or longer, or by output signals from the velocity calculating circuit 162b indicating that a movement direction of the camera system 10 is reversed. Further, a determination corresponding to the determination of the stop of scan may be made by operating an operation member of the camera system 10. For example, if an OFF operation of the release switch 131c is used, the determination may be more simply and reliably. The adjustment of exposure in a series of macro continuous shooting is of course controlled in each shot to achieve an appropriate exposure for a subject (specifically, a flower here) that a photographer attempts to photograph. Also, if an exposure amount is significantly changed while a series of macro continuous shooting is being performed, an exposure abnormality in the scan is displayed on the guide displaying portion 123a of the liquid crystal monitor 123.

Next, in step S11, the Bucom 101 causes the image processing portion 126 to generate a composite image from the plurality of images obtained by the macro continuous shooting and recorded in the recording medium 127. In step S11, the image processing portion 126 superimposes images adjacent to each other of the photographed images at a position where a maximum matching degree is achieved. As a matter of course, in order that boundaries of the superimposed areas are inconspicuous, image processing is performed around the boundaries so that the images are smoothly combined to each other. In order to combine images more smoothly, video photographing described later is also performed during the macro continuous shooting, and image correction for color, contrast, noise, and the like may be performed using image information of video images.

Also, in step S12, the image processing portion 126 employs a maximum contrast part in each image area to generate one composite image from a plurality of images. In the example shown in FIG. 7A to FIG. 7C, if the flower 11 is photographed, the part 11a is employed from the image photographed and recorded in FIG. 7A, the part 11b is employed in FIG. 7B, and the part 11c is employed in FIG. 7C to generate a composite image of the flower 11.

In FIG. 10A, in step S3, if a mode is not the photographing mode of macro continuous shooting, the current mode is a normal macro photographing mode, so that in step S13, the Bucom 101 determines whether or not the release operation is performed.

If the release operation is performed, in step S14, the Bucom 101 controls photographing and recording in response to the release photographing. Specifically, an image of a timing at which the release operation is performed is recorded in the recording portion as a photographed image, and the processing returns to step S1. Also, in step S13, if the release operation is not performed, the processing returns to step S1.

Also, in step S1, if a current mode is not the photographing mode, in step S15, the Bucom 101 determines whether or not a playback mode is selected. If the playback mode is selected, in step S16, the Bucom 101 performs a control operation of the playback mode, and then the processing proceeds to step S17.

In step S17, the Bucom 101 determines whether or not an ending operation such as turning off the release switch 131c is performed, and if such an ending operation is not done, the processing returns to step S1, and if such an ending operation is done, the processing in FIG. 10A is ended.

In the present embodiment having such an operation, by a simple operation that the camera system 10 is brought closer to a short-distance subject, a plurality of images, each of which is focused on some subject part are sequentially and continuously recorded at each distance. Then, after the photographing, image areas, each of which is focused on some part, are superimposed on each other at a position where a maximum matching degree is achieved, and a high-quality and very-large-depth-of-field composite image is generated.

Therefore, according to the present embodiment, there can be provided a photographing apparatus which can easily photograph an image of a short-distance subject with a high image quality and large depth of field as well as a composite image with a high image quality and quite large depth of field can be easily generated.

Also, according to the present embodiment, with the camera system 10, a photographing apparatus, being fixed to a focused point state, the camera system 10 is moved toward a subject, i.e., in the optical axis direction or the Z axis direction, and images are sequentially photographed at the state where maximum contrasts are achieved, and recorded as photographed images, so that photographed images including focused points with an image magnification maintained substantially constant can be simply obtained.

Figure 10B:
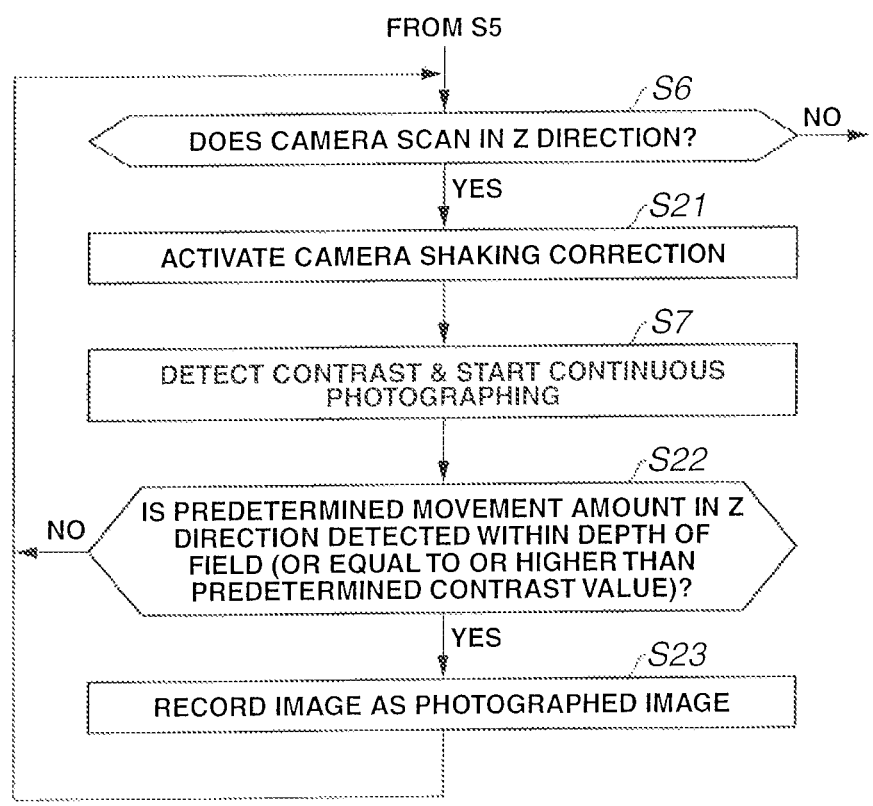
FIG. 10B is a flow chart showing a part of a processing procedure including macro continuous photographing in a modification of the first embodiment.

In addition, as a modification of the processing procedure in FIG. 10A, instead of recording an image as a photographed image at a position where a maximum contrast is achieved in FIG. 10A, as shown in FIG. 10B, an image may also be recorded at each detection (determination) of a predetermined movement amount substantially within a range of depth of field.

In FIG. 10B, in step S21 following the scan (scanning) of the camera in the Z direction in step S6, the vibration-proof control circuit 162 controls the operation of the actuator driving circuit 169 depending on the presence/absence of camera shaking and activates (makes active) a camera shake correcting function to correct camera shaking of the image pickup portion 117. It should be noted that the processing in step S21 may also be executed before step S6.

According to the processing in step S21, even if camera shaking occurs in a direction other than the Z direction in which the user brings the camera system 10 closer to the flower 11, being the subject, influence caused by the camera shaking on image pickup by the image pickup portion 117 can be reduced.

In step S7, following step S21, the Bucom 101 causes the image processing portion 126 to detect a contrast and starts an operation to perform macro continuous photographing.

Next, in step S22, the Bucom 101 determines whether or not the camera system 10 has been moved in the Z direction (direction toward the subject) by a predetermined movement amount, within the depth of field or at a predetermined contrast value (substantially corresponding to around an end of a range of the depth of field) or more (if the area has such a contrast value).

The predetermined movement amount is set to be smaller than about a range (width) of the depth of field in the Z direction. A setting portion for setting the predetermined movement amount may be provided to enable the user to freely set an amount at the time of initial setting of macro continuous photographing.

If the determination result in step S22 is not satisfied, then the Bucom 101 returns to the processing in step S6.

On the other hand, if the determination result in step S22 is satisfied, then in step S23, the control portion 101a of the Bucom 101 records an image every timing of the predetermined movement amount described above as a photographed image in the recording medium 127, being a recording portion.

In other words, within a range of the depth of field, or in a state having a contrast close to within a range of the depth of field, for each movement by a predetermined movement amount in the Z direction, an image is recorded as a photographed image in macro continuous shooting.

A movement amount detecting portion 101c in the control portion 101a (see FIG. 1) detects a predetermined movement amount in the Z direction in the following manner. In FIG. 8, a contrast curve Ca indicates variation characteristics of contrast values with respect to distances D observed when, with a position of the focus lens 202a fixed to a state in which the part 11a of the flower 11 is in focus, the camera system 10 is moved in the Z direction to vary the distances D to the flower 11.

In the characteristics Ca, if a distance D from the camera system 10 to the flower 11 is changed from the distance D1 to the distance D2, a contrast value is changed from a peak value Pa to a small value Pa'. Also, in a contrast curve Cb obtained by picking up images of the part 11b, a position of which is different from that of the part 11a of the flower 11, being the subject, if a distance from the camera system 10 to the flower 11 is changed from the distance D1 to the distance D2, a contrast value is changed from the small value Pb' to a peak value Pb. This also holds true for a contrast curve Cc of the part 11c. In this manner, in the present embodiment, a movement amount is calculated by monitoring contrast values in a plurality of regions of a subject.

Then, with a position of the focus lens 202a fixed, a movement amount can be calculated from the characteristics of the contrast curves Ca, Cb, and the like of different regions with respect to the distances D from the camera system 10 to a subject. In the present embodiment, information of characteristics values of contrast curves with respect to the distances D is pre-stored, for example, in a contrast characteristics storage portion 125a of the flash ROM 125. When the movement amount detecting portion 101c detects a predetermined movement amount within a range of the depth of field by referring to the information of the contrast characteristics storage portion 125a, the movement amount detecting portion 101c records an image of the timing as a photographed image in the recording medium 127, being a recording portion.

It should be noted that if the camera is moved by every predetermined movement amount, a counter 400 (see FIG. 1) for counting the number of shots (records) of an image may also be provided in order to continuously photograph and record a plurality of images. The movement amount detecting portion 101c of the control portion 101a may refer to a number counted by the counter 400 to photograph and record images by, for example, the number of times of photographing preset by the user in the counter 400.

In the case of such recording, a contrast value may also be recorded. After the processing in step S23, the processing returns to step S6, and the same processing is executed. The other processes are substantially the same as in FIG. 10A.

According to the present modification, the influence caused by camera shaking on image pickup can be reduced. Also, according to the present modification, since substantially within the depth of field, an image is recorded by every predetermined movement amount, (each part of) a subject can be reliably photographed within a range of the depth of field.

That is, because an image photographed and recorded within the depth of field and a photographed and recorded image adjacent to the image have an overlapped part within the range of the depth of field, also when a composite image is generated, a high-quality composite image can be easily generated.

Next, in the same manner as with the first embodiment, a photographing apparatus will be described which can photograph a high-quality and large-depth-of-field image of a subject within a short distance.

(Second Embodiment)

The present embodiment has substantially the same hardware configuration as that of the first embodiment, and photographing with a high image quality and large depth of field is performed by a processing procedure slightly different from that of the macro continuous shooting of the first embodiment.

FIG. 11 illustrates a schematic view of photographing, for example, a spherical subject 400 with a camera system 10B according to the present embodiment. In the camera system 10B, at the position of the menu button 131b of the camera system 10 in FIG. 6, the mode switch 131b' for changing a photographing mode to perform photographing is provided.

Further, as also illustrated in FIG. 6, acceleration signals from the Z axis acceleration sensor 173 of the body unit 100 are inputted to the acceleration detecting circuit 162a to detect the acceleration of the camera system 10B.

The acceleration is integrated by the velocity calculating circuit 162b and the position calculating circuit 162c, each of which has an integrator. The position calculating circuit 162c forms a detecting portion for detecting a movement amount of a focused position that moves when the camera system 10B according to the present embodiment is moved in the Z axis direction.

Also, in the present embodiment, according to the configuration shown in FIG. 1 to FIG. 5B, in the macro continuous shooting mode (in the present embodiment, a super-depth mode or a super-depth photographing mode), the focused position detecting portion 126a of the image processing portion 126 detects as a focused position a distance at which a contrast value of signals of images picked up by the image pickup portion 117 reaches a maximum, in the case where the focus lens 202a is moved in the Z axis direction (optical axis direction).

Also, the focused position setting portion 101b of the Bucom 101 holds (fixes) a focused position of the taking lens 202 to the focused position detected by the focused position detecting portion 126a (and also fixes a position of the focus lens 202a) so that the camera system 10B moves in substantially the optical axis direction of the taking lens 202 with an image magnification maintained constant.

Also in the present embodiment, in a state where an area has a constant value equal to or greater than a predetermined contrast, the control portion 101a of the Bucom 101 has a function of a record control portion that sequentially records an image as a photographed image each time the detecting portion detects a predetermined amount of movement of a focus position to a subject within depth of focus of the taking lens 202.

The camera system 10B composing a photographing apparatus according to the present embodiment includes: the image pickup portion 117 that converts an optical image of a subject formed by the taking lens 202 into an electronic image; the focused position setting portion 101b that sets focused position of the optical image by the taking lens 202; and the position calculating circuit 162c as a detecting portion that detects a movement amount of the focused position when the camera system 10B moves in substantially an optical axis direction of the taking lens 202 with image magnification maintained constant and with the focused position being held, the position being set by the focused position setting portion 101b, characterized in that if the detecting portion detects movement of the focused position by a predetermined amount within a range of the depth of field, a plurality of photographed images are sequentially recorded.

Figure 12:
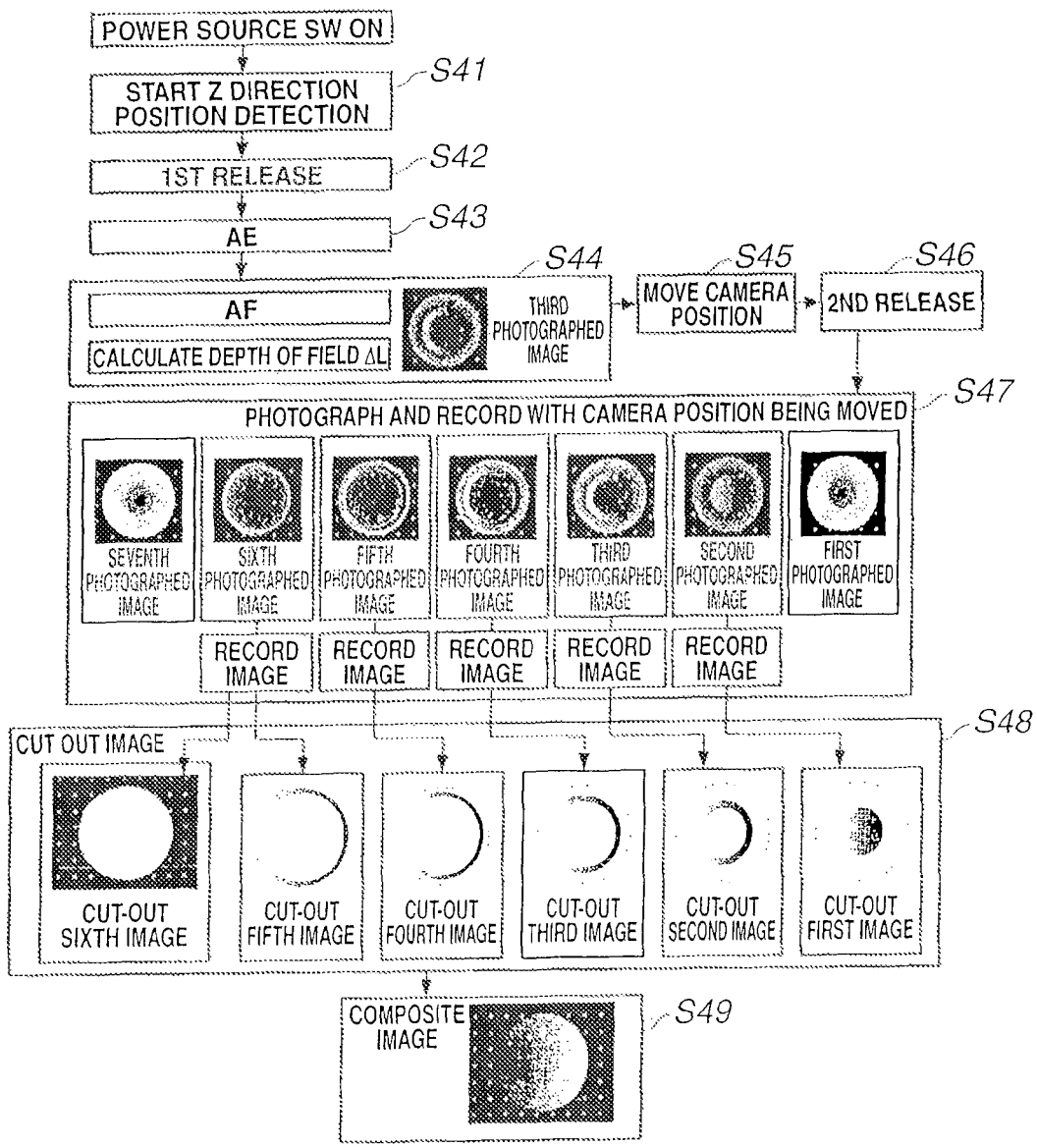
FIG. 12 is a diagram illustrating a general flow of an operation for, with the camera system of the second embodiment, sequentially bringing a part of a subject into focus to sequentially record photographed images, and generating a composite image from the recorded photographed images.

In the present embodiment, for example, an operation for photographing the sphere subject 400 will be described. FIG. 12 illustrates a schematic operation in the present embodiment.

Once the power supply switch 131a of the camera system 10B is turned on and a super-depth photographing mode is set with the mode switch 131b', as shown in step S41, the Z axis acceleration sensor 173 operates and detection of a position in the Z direction starts.

Acceleration signals from the Z axis acceleration sensor 173 are inputted to the acceleration detecting circuit 162a of the vibration-proof control circuit 162 and A/D-converted. Then, offset correction (correction for resetting voltage outputted when acceleration is 0, to 0) and gain adjustment (adjustment of the size of outputted voltage) are performed and acceleration signals corresponding to the acceleration are outputted from the acceleration detecting circuit 162a to the velocity calculating circuit 162b having the integrator.

The velocity calculating circuit 162b outputs velocity signals obtained by the integrator integrating the acceleration signals to the Bucom 101 and the positioP calculating circuit 162c. The position calculating circuit 162c having the integrator outputs position signals obtained by integrating the velocity signals to the Bucom 101.

Figure 13A:
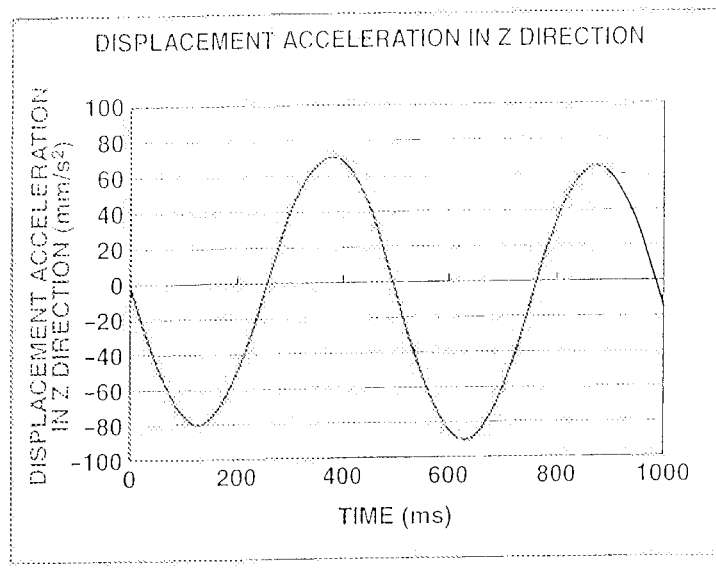
FIG. 13A to FIG. 13C are diagrams explaining output signals from the circuit composing the detecting portion in the second embodiment.
Figure 13B:
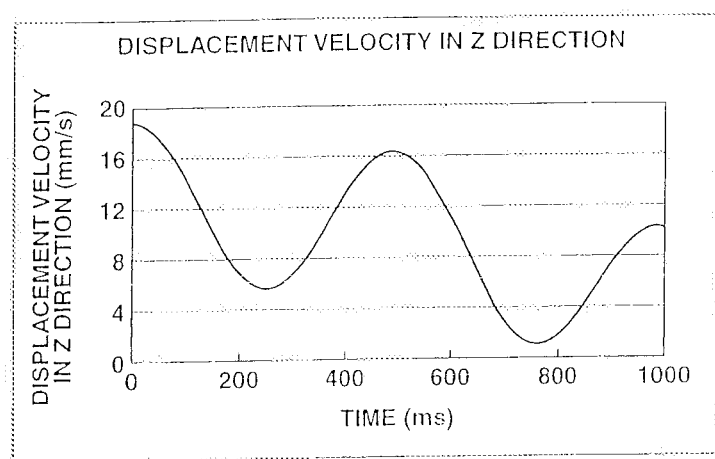
Figure 13C:
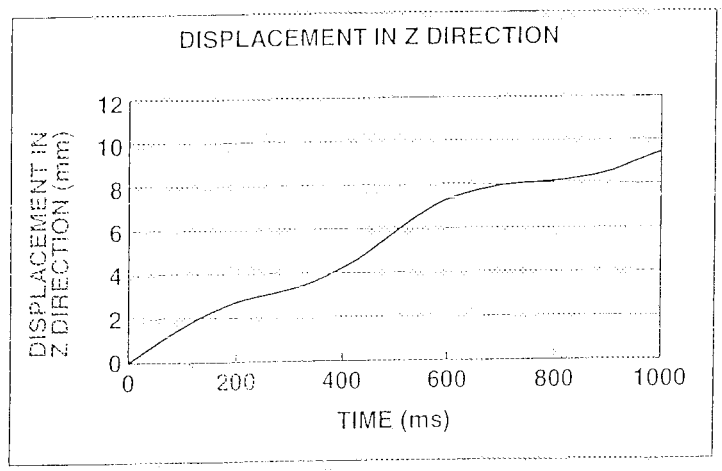

FIG. 13A, FIG. 13B, and FIG. 13C illustrate examples of accelerations, velocities, and positions of the camera system 10B obtained by simulating the case where in position detection in the Z axis direction of the camera system 10B, the user moves the camera system 10B in his/her hand in the Z axis direction (closer to the subject 400).

Although vertical axes of the respective graphs indicate accelerations, velocities, and positions of final calculation results, outputs from the acceleration detecting circuit 162a, the velocity calculating circuit 162b, and the position calculating circuit 162c in FIG. 11 are corresponding voltage signals.

Next, the operation of the camera system 10B will be described with reference to FIG. 12. In the super-depth photographing mode set by the operation of the mode switch 131b', if the power supply switch 131a is turned on, the detection of a position in the Z direction of the camera system 10B starts (the mode switch 131b' may also be set after the power supply switch 131a is turned on).

Then, as shown in step S42, if the user operates the release switch 131c and the 1st release switch is turned on, AE (automatic exposure) in step S43 and AF (autofocus) in step S44 operate based on a photographed image (through-the-lens image), a diaphragm of the lens unit 200 and shutter velocity of the body unit 100 are determined to achieve proper exposure, a predetermined part of the subject 400 is brought into focus, and relative positions of the taking lens 202 and the image pickup portion 117 are determined.

At this time, as shown in step S44, short-distance-side depth of field $\Delta L$ (the short-distance-side depth of field is a numerical value smaller than depth of field at an infinite side) is calculated from a diaphragm value F of the lens unit 200, a focal length f, and a subject distance L calculated from a position of the focus lens 202a.

A range of the depth of field (a width in the Z direction) in the present embodiment is sum of the short-distance-side depth of field $\Delta L$ and the infinite-side (far-point-side) depth of field, and the short-distance-side depth of field $\Delta L$ is substantially ½ of the range of the depth of field. The short-distance-side depth of field $\Delta L$ in the present embodiment corresponds to a value of a predetermined amount in the range of depth of field (predetermined movement amount).

Step S44 shows an image example described below in which AF is achieved, for example, on around a third photographed image.

If it is assumed that a diameter of a permissible circle of confusion is $\delta$ and $x=((L-2f)+(L-2f)^2-4f^2)^{1/2}/2$, $\Delta L=xf^2/(\delta Fx+f^2)$.

In this state, as shown in step S45, the camera system 10B is moved away from the subject 400, and the movement is stopped in a position at which it can be recognized through a finder (here, an electronic finder) that the subject 400 is out of focus (i.e., the camera system 10B is moved away until a distance at which the subject 400 becomes out of focus).

Then, as shown in step S46, the user operates the release switch 131c to turn a 2nd release switch on. In response to the operation, the Bucom 101 starts to record a photographed image each time the detecting portion detects the movement by a predetermined amount.

With this state maintained, the user brings the camera system 10B closer to the subject 400. Then, as shown in step S47, at a position where a photographed image of the subject 400 achieves a predetermined contrast (or enters the depth of field to be in focus), the state of a first photographed image is attained. This image is photographed and recorded (recording the first photographed image). It should be noted that although FIG. 12 illustrates an example in which the first photographed image is not recorded, images may also be recorded from the first photographed image.

An image is recorded and at the same time, the position of the camera system in the Z direction is reset to O. Thereafter, when a position change of the camera system 10B in the Z direction by the short-distance-side depth of field $\Delta L$ (i.e. movement of a focused position by a predetermined amount within the range of the depth of field) is calculated based on a detection value from the Z axis acceleration sensor 173, photographing is performed (recording a second photographed image). After that, in the same manner, each time the camera system 10B is displaced by the short-distance-side depth of field $\Delta L$ in the Z direction, an image is photographed and recorded. The repetition continues until the 2nd release switch is turned off.

FIG. 14 is a conceptual diagram illustrating a graph of a range of depth of field (ranges of short-distance-side depth of field and infinite-side depth of field) calculated with respect to each subject distance L based on an F number F of a diaphragm, a focal length f, a subject distance L, and a diameter of permissible circle of confusion $\delta$ of the camera system 10B which are specific, and positional relationship between the subject 400 and the camera system 10B.

Assume that the F number F=8, the focal length f=100 mm, the subject distance L=500 mm, and the diameter of permissible circle of confusion $\delta$=0.033 mm. The short-distance-side depth of field $\Delta L$ is assumed to be 1.82 mm. Then, if the subject 400 is photographed for each movement of $\Delta L$, images with about ½ of the ranges of depth of field overlapping with each other are obtained.

It should be noted that the embodiment is not limited to the case in which images are photographed and recorded so that about ½ of the ranges of the depth of field overlap, and it is desirable to photograph and record images so that parts of the images overlap with each other within at least ranges of depth of field for each movement by a predetermined amount within the ranges of the depth of field. That is, if images are photographed and recorded so that parts of the images overlap within at least ranges of the depth of field, when two photographed and recorded images temporally adjacent to each other are combined, clearly photographed overlapping regions of the images can be aligned with each other, so that the images can be easily aligned in image combining. As a result, the generation of a high-quality and large-depth-of-field composite image is facilitated.

An in-focus region of each image is cut out by a band-pass filter that extracts a predetermined spatial frequency, namely, a higher spatial frequency component from a series of images photographed and recorded as shown in step S48 in FIG. 12.

Also, since adjacent ones of these images have an overlapping part, the region is detected and the overlapping parts of the respective images are aligned with each other to combine the super-depth images of the subject.

Then, a background image of a last photographed image (an image obtained by cutting out the super-depth image of the subject from the photographed image) and the super-depth image of the subject is combined to obtain an objective composite image as shown in step S49.

A series of the image processing to generate a composite image from photographed images may be executed by the image processing portion 126 in the camera system 10B, or of course, photographed and recorded image data may also be transferred to another computer and the other computer may generate a composite image.

Figure 15:
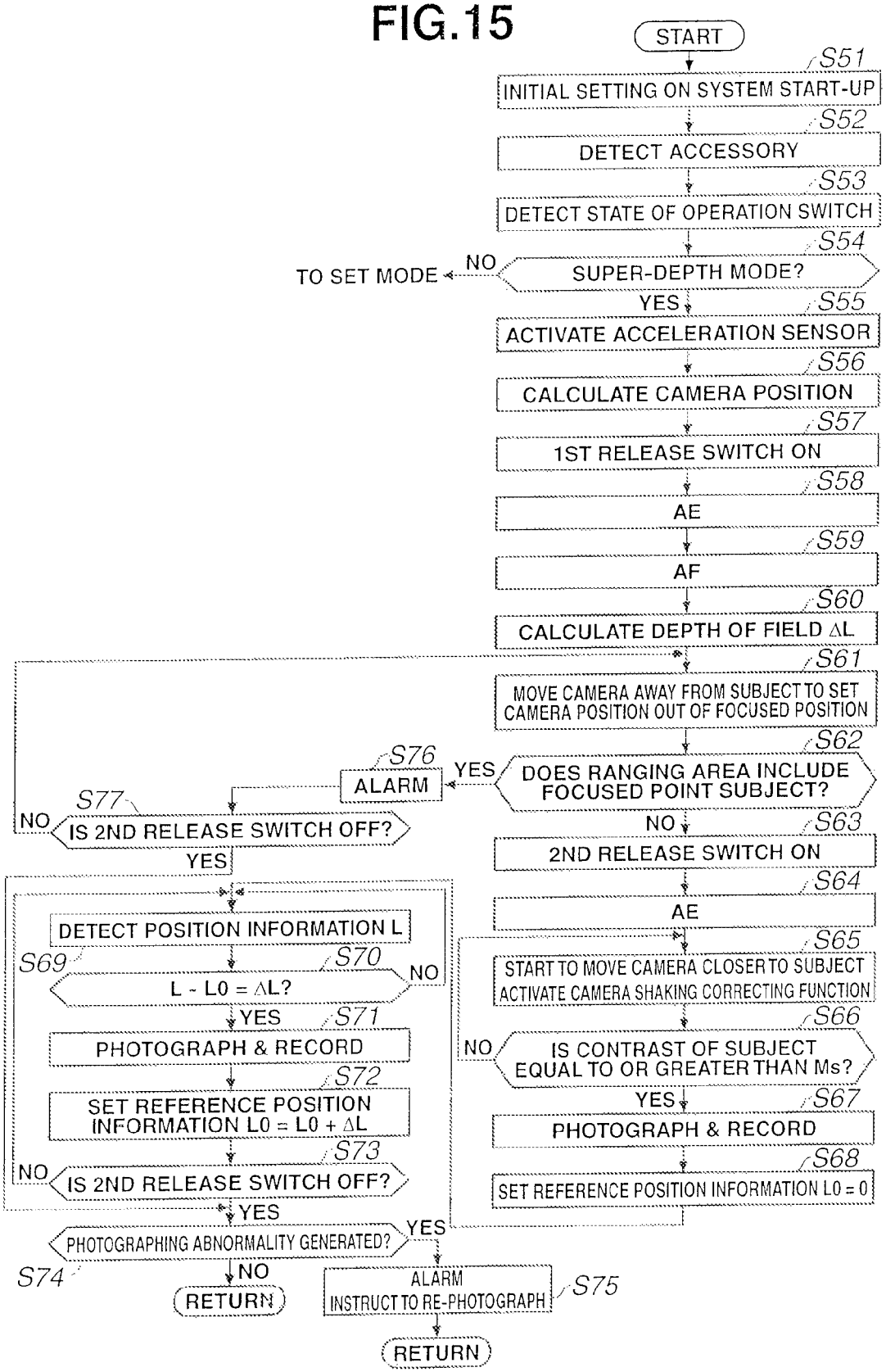
FIG. 15 is a flow chart explaining details of a photographing operation of the camera system according to the second embodiment.
Figure 16:
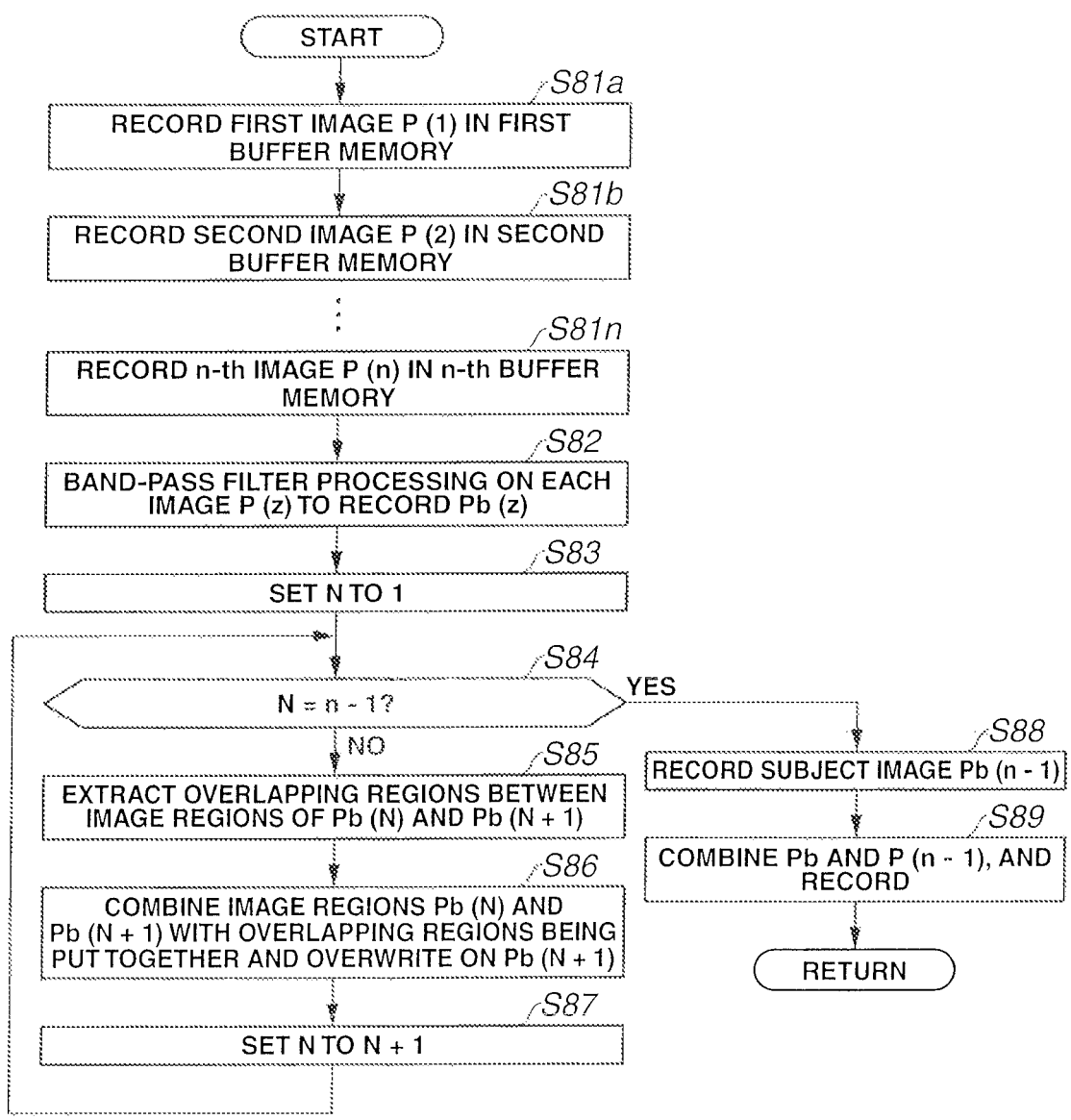
FIG. 16 is a flow chart explaining details of generation of a composite image from the recorded photographed images in accordance with the second embodiment.

FIG. 15 and FIG. 16 are flow charts showing the operation of the camera system 10B. More specifically, FIG. 15 is a flow chart of a photographing mode for obtaining a large-depth-of-field super-depth image by the camera system 10B, and FIG. 16 is a flow chart showing processing to combine super-depth images using the obtained images.

Once the super-depth photographing mode starts, in first step S51, the Bucom 101 performs the initial setting on system start-up. Next, in step S52, the Bucom 101 detects accessories such as the lens unit 200. Also, in step S53, the Bucom 101 detects the state of the operation switches.

Then, in step S54, the Bucom 101 determines whether or not the super-depth mode is set by an operation switch. If the super-depth mode is not set, the processing shifts to a process corresponding to a set mode.

In contrast, if the super-depth mode is set, in step S55, the Bucom 101 activates the acceleration sensors. The respective acceleration sensors start their operation to each detect acceleration. In step S56, the position calculating circuit 162c composing a detecting portion calculates a position of the camera system 10B by integration particularly using acceleration signals from the Z axis acceleration sensor 173.

In step S57, the user turns the 1st release switch on. Then, in steps S58 and S59, AE (automatic exposure) and AF (autofocus) operate and a diaphragm of the lens unit 200 and shutter velocity of the body unit 100 are determined to achieve a proper exposure, which leads to a focused point state where a predetermined area of the subject 400 is in focus, and thereby relative positions of the taking lens 202 and the image pickup portion 117 are determined.

Also, in step S60, a subject distance L is derived from a diaphragm value F of the lens unit 200, a focal length f, and a position of the focus lens 202a, and further, short-distance-side depth of field $\Delta L$ is derived from the subject distance L by calculation.

Focusing is performed by driving the focus lens 202a in AF, and a position of the focus lens 202a is detected based on an infinite position of the subject with the position detecting sensor 204a. The subject distance L used to calculate the depth of field $\Delta L$ is calculated using the position data and a focus position displacement amount of the displacement of the focus lens 202a.

In this manner, after the taking lens 202 is set to a predetermined focused position, in step S61, the user moves the camera system 10B away from the subject 400 to set a position of the camera system 10B outside the focused position. The user can distinguish whether or not the camera system 10B is set outside the focused position by viewing a finder image to determine whether the entire finder image is unclear. Of course, being outside the focused position may also be indicated by displaying a focused position on the finder.

Next, in step S62, the Bucom 101 determines whether or not a ranging area includes the subject 400 in focus using a contrast value in AF (by) contrast. A threshold for determination is set to a level value of the case in which a subject is outside a range of the depth of field. Then, if a contrast value is lower than the threshold, it can be determined that the subject 400 in focus does not exist.

A ranging area may be an overall region of an image or a part of an image. Further, a ranging area may be automatically set or manually set. In the case of the manual setting, an area broader than a ranging area where AF is firstly performed is set. Alternatively, when the camera system 10B is displaced from the subject, areas with maximum contrast values may be sequentially detected, and ranging areas may be sequentially shifted to the areas.

If the determination in step S62 is not satisfied, in step S63, the user turns the 2nd release switch on. Also, before step S63, a guide may be displayed for the user to turn the 2nd release switch on.

After the 2nd release switch is turned on, as shown in step S64, AE is performed. If an exposure value of the AE in step S64 is changed from an exposure value of the AE in step S58 by at least a predetermined value, then short-distance-side depth of field ΔL is calculated again from the F value of the diaphragm at the time.

Next, in step S65, the user starts to move the camera system 10B in his/her hand closer to the subject 400 as well as activates the camera shaking correcting function (into active) in the same manner as step S21 in FIG. 10B.

Immediately before step S65, the Bucom 101 composing control means may display a guide about an operation for the user to move the camera system 10B closer to the subject 400.

Next, in step S66, the Bucom 101 determines whether or not a contrast of the subject is equal to or greater than a threshold Ms used for determining whether the subject is within a range of the depth of field.

The determination as to whether or not a contrast is equal to or greater than the threshold Ms is made so that a side closest to the subject 400 comes into focus at the time of photographing based on the displacement velocity (movement velocity) of the camera system 10B, a shutter time lag (the time between a signal of clicking the shutter is generated and the shutter starts to open), and the short-distance-side depth of field ΔL.

That is, because a position of the camera system 10B at which a contrast of the subject 400 is detected and a position of the camera system 10B at which the shutter is clicked vary depending on those numerical values, a threshold Ms will be set to a contrast lower than a contrast of a focused point.

If the contrast is not equal to or greater than the threshold Ms in the determination of step S66, then the processing returns to step S65. If a determination result indicates that the contrast is equal to or greater than the threshold Ms, then the processing proceeds to step S67.

In step S67, photographing is performed and a photographed image is recorded in the recording medium 127. In this case, the first photographed image is recorded.

Also, in step S68, reference position information L0 is set to 0. The reason why the reference position information L0 is set when the first photographed image is obtained is that position information of the camera system 1013 is obtained at the start of the photographing, and thereby the position information of the camera system 10B is obtained with precision.

In step S69, following step S68, in which the reference position information L0 is set to 0, the position information L is detected. Then, the following step S70 determines whether or not the portion for detecting a movement amount, being the position calculating circuit 162c, has detected a movement amount corresponding to the short-distance-side depth of field ΔL (in other words, a predetermined movement amount within the range of the depth of field).

Namely, it is determined whether or not position information L−L0=ΔL is achieved. If the short-distance-side depth of field ΔL corresponding to the predetermined movement amount is not achieved, then the processing returns to step S69. In contrast, if the short-distance-side depth of field ΔL is achieved, then the processing proceeds to step S71.

In step S71, the control portion 101a of the Bucom 101 records photograph information (e.g., a frame number of photographing) and a photographed image in the recording medium 127. The second photographed image is recorded in the recording medium 127 and in the following step S72, the reference position information L0 is set to L0+ΔL.

Then, in the following step S73, the Bucom 101 determines whether or not the 2nd release switch is turned off. If the 2nd release switch is not turned off, then the processing returns to step S69 and the same operation is repeated. For example, after the second photographed image is recorded as described above, a plurality of photographed images, i.e., a third photographed image, a fourth photographed image, and so on are sequentially recorded.

Then, if the user determines that a desired photographed image (subject image) is recorded with the camera system 10B, then the user may turn the 2nd release switch off. If the 2nd release switch is turned off, then further in step S74, the Bucom 101 determines whether or not a photographing abnormality is generated. If a photographing abnormality is not generated, then the processing returns to the first step S51 or the processing in FIG. 15 is ended. In contrast, if a photographing abnormality is generated, then an instruction of re-photographing and an alarm are made in step S75. Thereafter, the processing returns to the first step S51 and re-photographing is performed.

For example, if the movement velocity of the camera system 10B is so high that image photographing lags behind the movement, and images enough to combine are not obtained, or if a clearly large camera shake is generated (which can be determined by evaluating a detection value from the camera shake correct mechanism described in the first embodiment), then a photographing abnormality generated, and after the photographing ends, an alarm (a beep or display) is given to make an instruction (voice or display) for re-photographing.

In the re-photographing, if the photographer does not change the setting of the photographing, a plurality of images around an image frame in which the photographing abnormality was generated in the previous photographing may be photographed and recorded.

Also, in the determination of step S62, if the ranging area includes the subject 400 in focus, then in step S76, an alarm is given and in step S77, following the alarm, the Bucom 101 determines whether or not the 2nd release switch is turned off. If the 2nd release switch is not turned off, then the processing returns to step S61, and if the 2nd release switch is turned off, then the processing proceeds to step S74.

In the super-depth mode shown in FIG. 15, a plurality of photographed images required to generate a very-large-depth-of-field composite image can be acquired by a simple operation. Because the respective photographed images photographed and recorded are set within the depth of field for some region in the subject 400, the region of the images has a fine image quality, namely, a high image quality.

Next, an operation to generate a composite image from a plurality of obtained photographed images will be described with reference to FIG. 16. In the following description, it is assumed that the number of photographed images is n (a natural number being 2 or more).

Once the operation for a composite image starts, in step S81a, the image processing portion 126 records (transfers) a first photographed image P(1) (in FIG. 16, a photographed image is simply abbreviated as an image) recorded in the recording medium 127 into buffer memory, in step S81b, the image processing portion 126 records (transfers) a second photographed image P(2) into the buffer memory, . . . , in step S81n, the image processing portion 126 records (transfers) an n-th photographed image P(n) into the buffer memory.

Next, in step S82, the image processing portion 126 executes band-pass filter processing that passes image signals of each photographed image P(z) (where z=1, 2, . . . , n) through a band-pass filter to extract an image region Pb(z) in focus in each photographed image P(z), and records the extracted image region in the buffer memory.

Next, in step S83, the image processing portion 126 sets a processing parameter N to 1. Then, in step S84, the image processing portion 126 determines whether or not N matches with n−1.

In this case, since N does not match with n−1, in step S85, the image processing portion 126 extracts overlapping regions between image regions of image regions Pb(N) and Pb(N+1).

Next, in step S86, the image processing portion 126 aligns the extracted overlapping regions between the image regions Pb(N) and Pb(N+1) with each other to combine the image region Pb(N) with the region Pb(N+1), and overwrites the composite image on the image region Pb(N+1).

Next, in step S87, the image processing portion 126 sets N to N+1 (in this case, N is 2), and the processing returns to step S84. Then, in the case of N being 2, the processing of the foregoing steps S85 to S87 is executed in the same manner. In this way, the processing in steps S85 to S87 is repeated until N becomes n−1.

In this manner, an image region in which all the in-focus image regions are superimposed (i.e., a subject image in focus) Pb(N) (where N=n−1) is generated. Then, in step S84, since N matches with n−1, in step S88, the image processing portion 126 records a subject image Pb(n−1) in focus in the buffer memory.

Next, in step S89, the image processing portion 126 combines the subject image Pb(n−1) in focus with an (n−1)-th photographed image P(n−1) and records a resultant composite image in the buffer memory or the recording medium. Then, the processing in FIG. 16 is ended, or returns to the first step S81a to execute the same processing if there is another photographed image.

According to such an operation, in the super-depth mode, a high-quality and very-large-depth-of-field composite image can be easily generated from a plurality of photographed images.

In FIG. 15 and FIG. 16, the operation of the functions relating to the super-depth mode in the second embodiment has been described, and now the operation including the super-depth mode will be described with a flow chart in FIG. 17.

Once the camera system 10B is turned on, the Bucom 101 starts an operation. Then, in the same manner as in FIG. 15, the initial setting on system start-up is performed in step S101, detection of accessories is performed in step S102, and detection of a state of operation switches is performed in step S103.

Next, in step 104, the Bucom 101 determines whether or not a playback button is pressed on. If the playback button is pressed on, in step S105, a process of playback is executed.

In step S104, if the playback button is not pressed on, or in step S105, the playback processing ends, then in step S106, the Bucom 101 determines whether or not a video button is pressed on. If the video button is pressed on, then in step S107, a process to reverse a recording flag is executed.

The video recording state (in which a through-the-lens image is on the liquid crystal monitor 123) begins. A determination in step S108 as to whether the state is a video recording state becomes yes, and step S109 and subsequent processes are executed. Then, the determination in step S106 as to whether or not the video button is pressed on is made by loop.

Then, further, if the determination on the video button ON is yes (the recording button is pressed again), the recording flag is reversed in step S107 and the video recording state is ended. In this case, the determination in step S108 as to whether or not the state is the video recording state is no.

If a determination result in step S108 is the video recording state, then AE is performed in step S109, video taking is performed in step S110, AF is performed in step S111, image processing is performed on the taken video in step S112, and the image is recorded in the recording portion in step S113. After step S113, the processing shifts to step S118.

In contrast, if the determination in step S108 is not the video recording state, in step S114, the Bucom 101 determines whether the 1st release switch is changed to an ON state.

If the 1st release switch is changed to the ON state, then still image photographing is ready. In step S115, AE is performed, in step S116, still image photographing is performed and the photographed image is displayed on a display monitor being the liquid crystal monitor 123, and in the following step S117, AF is performed.

In the following step S118, the processing determines whether or not the power supply is turned off, and if the power supply is not turned off, then the processing returns to step S104.

If the 1st release switch is not changed to the ON state in step S114, then the processing is shifted to step S119, where the Bucom 101 determines whether the 2nd release switch is held ON.

If the 2nd release switch is held ON, then a still image is photographed in step S120, and in step S121, the image processing portion 126 performs image processing on the photographed still image. In step S122, the image-processed still image is recorded and the processing shifts to step S118. In the still image photographing, if the 1st release remains ON, the image photographing operation continues and the display monitor continues to display an image. Each time the 2nd release is turned on, one frame of a still image is photographed and recorded.

Figure 17:
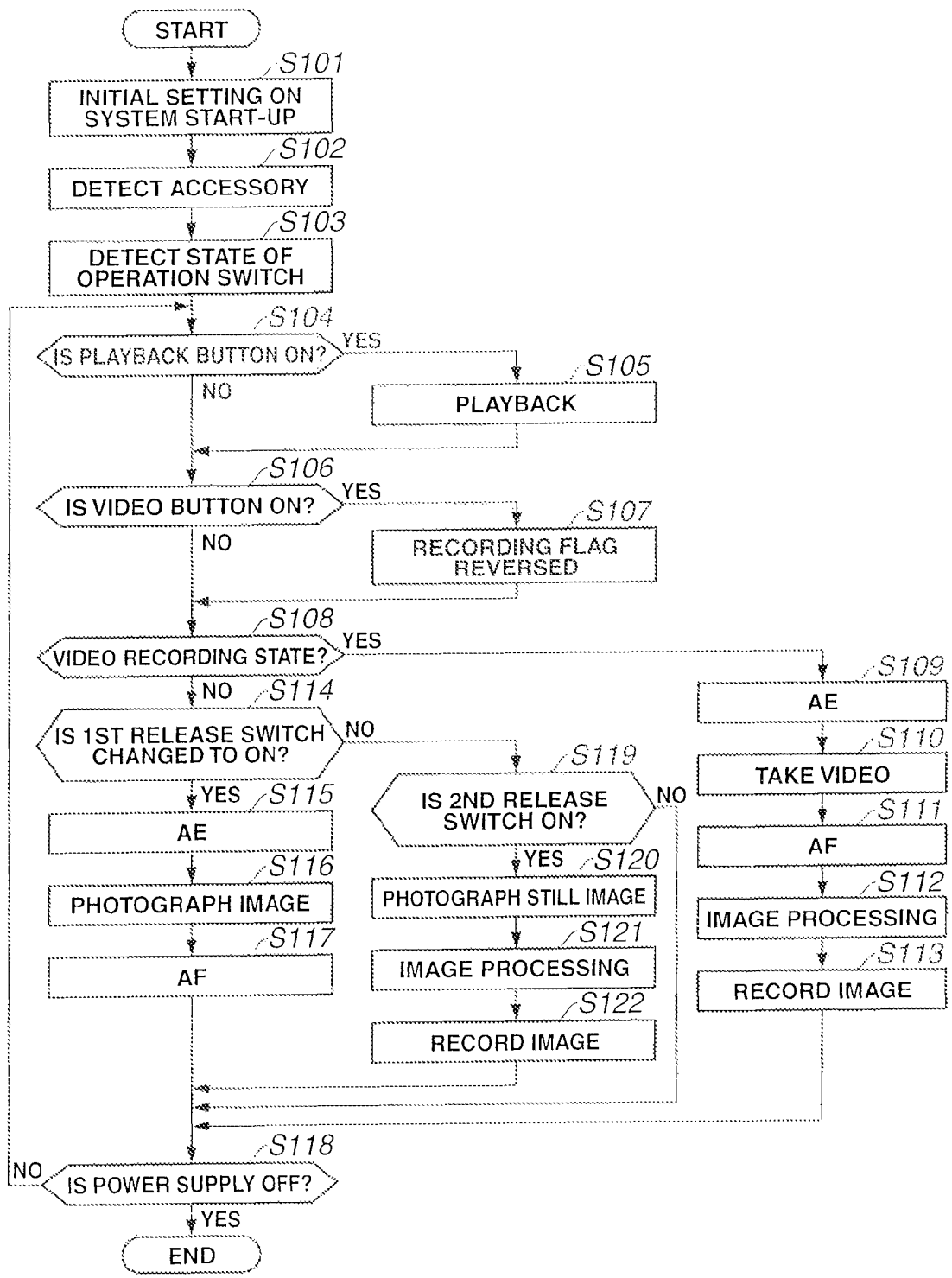
FIG. 17 is a flow chart of an operation including ordinary photographing by the camera system according to the second embodiment.

In step S119, also if the 2nd release switch is not held ON, the processing shifts to step S118, and if the power supply is turned off, the display monitor goes blank, and the processing in FIG. 17 is ended.

Figure 18:
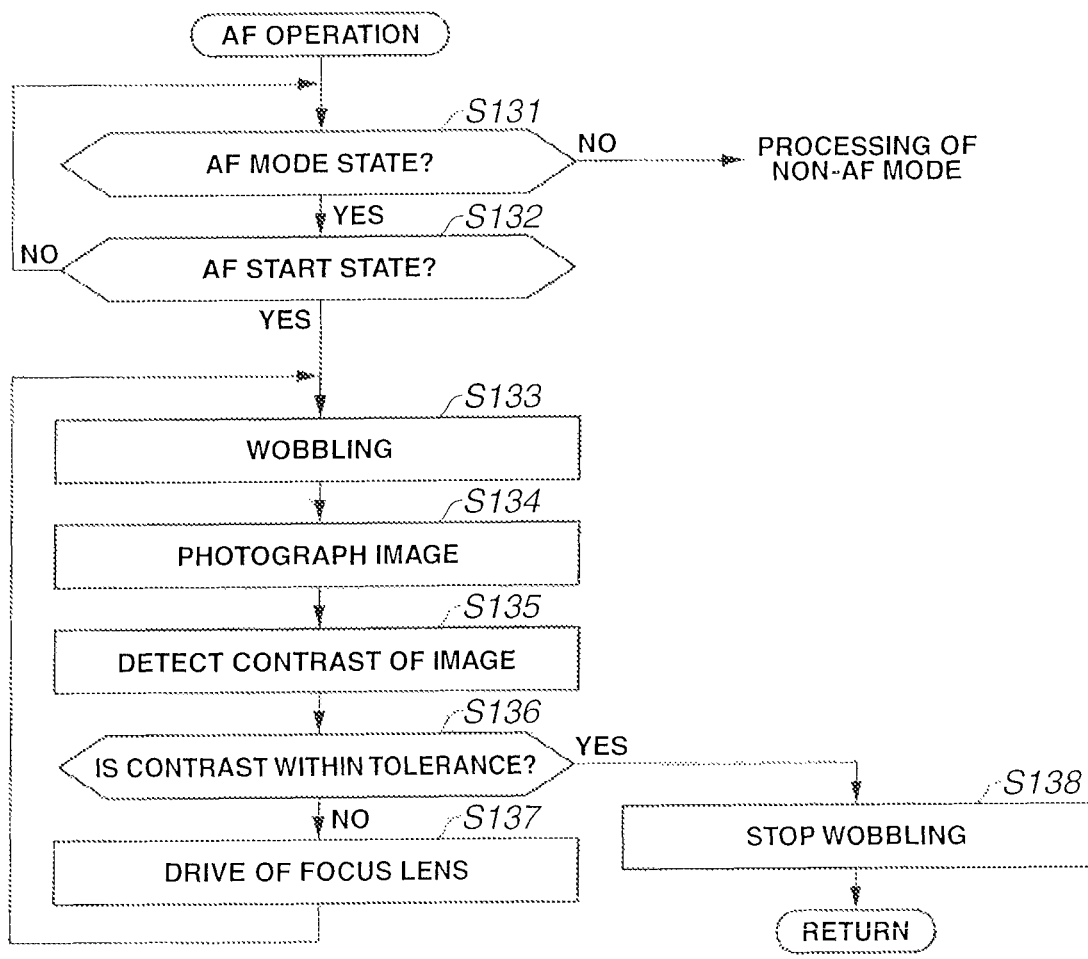
FIG. 18 is a flow chart of an operation of autofocus.

Also, the AF operation in the present embodiment is as shown in FIG. 18. Once the AF operation starts, in the first step S131, the Bucom 101 determines whether or not a current state is an AF mode. If a determination result indicates that the current mode is not the AF mode, the processing shifts to a process for a non-AF mode.

In contrast, if a determination result indicates that the current mode is the AF mode state, then in step S132, the Bucom 101 determines whether or not the current state is an AF start state. If the current state is not the AF start state, the processing returns to step S131.

On the other hand, if the current state is the AF start state, then in step S133, the Bucom 101 executes a wobbling process. The wobbling vibrates the focus lens 202a or a movable lens composing the taking lens 202 in the optical axis direction at a predetermined frequency using drive signals of a sinusoidal wave. The operation indicates a direction in which a focused point of a direction where a contrast becomes higher.

Next, in step 134, the Bucom 101 controls to perform image photographing, and as indicated in step S135, the image processing portion 126 detects an image contrast. Next, in step S136, the image processing portion 126 determines whether or not the detected contrast is within tolerance in the AF.

If a determination result indicates that the contrast is not within the tolerance, then in step S137, the Bucom 101 drives the focus lens 202a in a direction in which a contrast becomes higher, and the processing returns to step S133.

In contrast, if a determination result indicates that the contrast is within the tolerance, then in step S138, the Bucom 101 stops the wobbling and ends the AF operation.

Figure 19A:
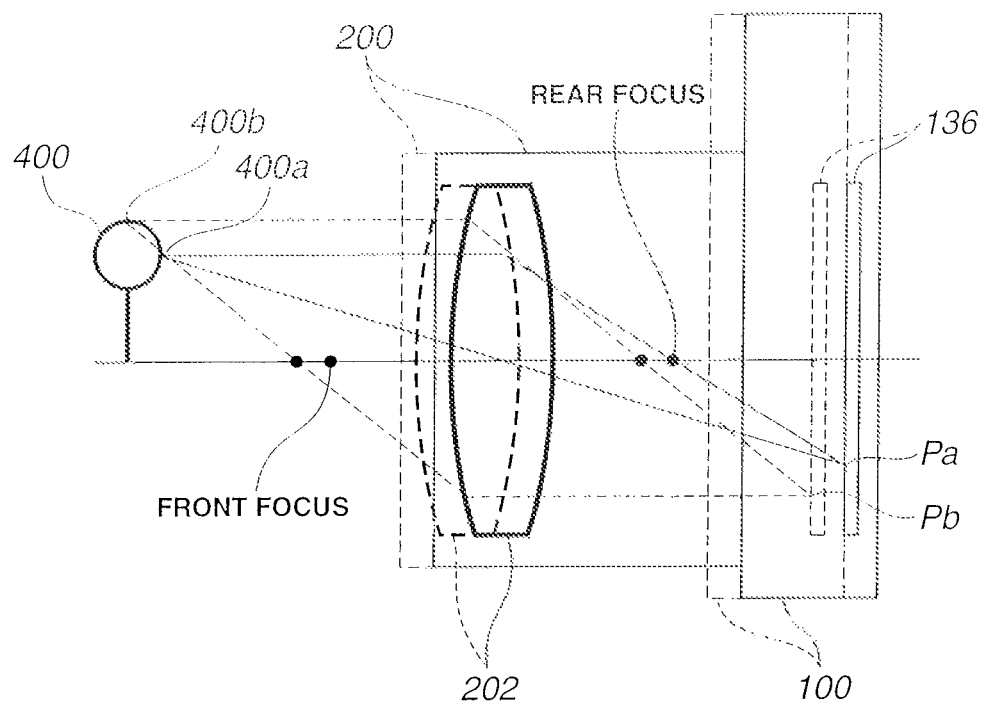
FIG. 19A and FIG. 19B are explanatory diagrams of a difference in photographing between the present embodiment and a conventional example.
Figure 19B:
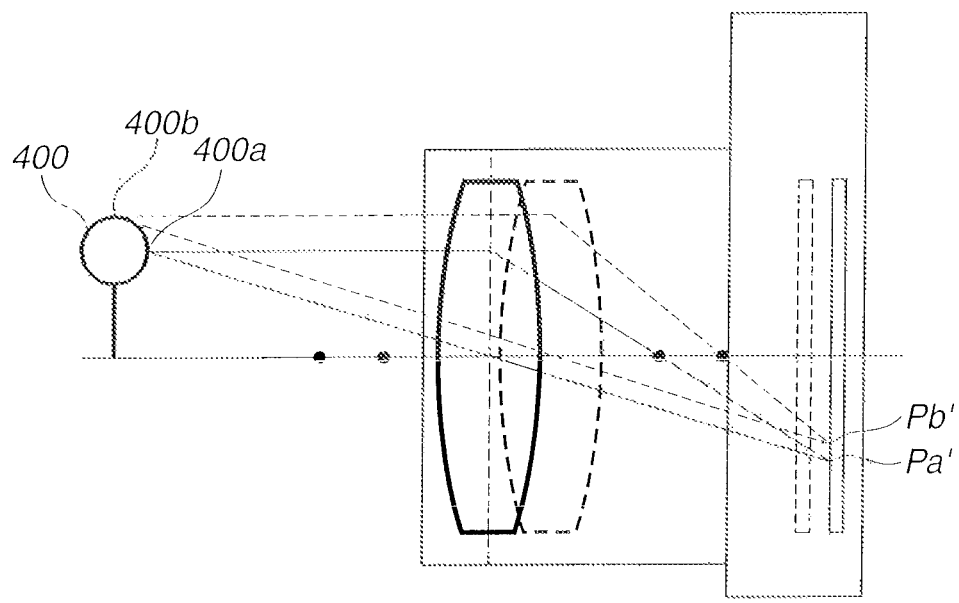

The photographing with the super-depth mode according to the present embodiment and a photographing scheme according to a conventional example are different as shown in FIG. 19A and FIG. 19B.

FIG. 19A illustrates how to photograph a short-distance subject 400 by using the camera system 10B according to the present embodiment with the taking lens 202 set to a predetermined focused point. In this case, in a photographing state indicated by solid lines, an image of a position (part position) 400a of the subject 400, the position being close to the camera system 10B, is formed at a position Pa of the CCD chip 136.

If the camera system 10B is then moved toward the subject 400 to a position indicated by dotted lines, an image of the part position 400b more distant from an optical axis than the part position 400a of the subject 400 is formed at a position Pb of the CCD chip 136.

In this way, distances from the optical axis to the positions Pa and Pb, at which optical images according to the present embodiment are formed, maintain a relationship that reflects distances from the optical axis to the part positions 400a and 400b of the subject 400, namely, the size of the subject.

FIG. 19B illustrates how to photograph the subject 400 according to a conventional example. In the conventional example, (a focus lens composing) a taking lens in a camera system is moved to perform photographing.

If the taking lens is focused on the part position 400a of the subject 400, an image of the part position 400a is formed at a position Pa' of a CCD chip as indicated by solid lines.

On the other hand, if the taking lens is focused on the part position 400b, more distant from the camera system than the part position 400a, then the taking lens moves to a position indicated by dotted lines, and an image of the part position 400b is formed at a position Pb' of the CCD chip as indicated by dotted lines. In this case, relationship of distances from the optical axis to the positions Pa' and Pb' does not reflect distances from the optical axis to the part positions 400a and 400b of the subject 400.

Namely, in the conventional example, image magnification of a plurality of photographed images is changed as well as there arises a case in which a relationship between/among a plurality of images may reverse sizes at a subject side. Therefore, if a composite image is generated from a plurality of photographed images, it is challenging to generate the composite image faithfully reflecting the size of the subject.

In contrast, according to the camera system 10B of the present embodiment (or according to the camera system 10 of the first embodiment), as illustrated in FIG. 19A, since a plurality of images are photographed with the size of the subject being reflected, for example, with image magnification being maintained constant, a composite image that reflects the size of the subject can be easily generated.

Therefore, according to the present embodiment, a plurality of high-quality and large-depth-of-field images of a short-distance subject can be easily photographed, and a high-quality and very-large-depth-of-field composite image can be easily generated from the photographed images. Also, an influence on image pickup can be reduced by camera shaking correction.

(Modification of Second Embodiment)

FIG. 20 represents a sequence of the camera system 10B according to a modification of the second embodiment. A configuration of the camera system 10B according to the present modification is substantially the same as that of the second embodiment. Note that in the present modification, the lens driving mechanism 204 in FIG. 1 forms a focused position moving portion 204c that moves at least a part of lenses composing the taking lenses 202 in substantially the optical axis direction with a focused position and image magnification being maintained constant.

It should be noted that not only the taking lens 202, but also the image pickup portion 117 or an image pickup device may be moved in the optical axis direction with a focused position and image magnification being maintained constant, to compose a focused position moving portion. Because the others are the same as those in the second embodiment, a description thereof will be omitted.

The present modification is different from the second embodiment in that for example, a focal position of the subject 400 is changed by displacing the focus lens 202a instead of moving the camera system 10B toward the subject 400. Thus, for example, the camera system 10B may be fixed to a tripod to eliminate the need for shake correction, and it is also not necessary to detect a position of the camera system 10 from the Z axis acceleration sensor 173.

However, if focusing is performed by displacing the focus lens 202a, since magnification of an image (more precisely, lateral magnification, obtained by dividing the size of a vertical optical image from the optical axis by the size of subject) is changed, in order not to change lateral magnification of the image, zooming is carried out by displacing the variable power lens 202b.

Here, lateral magnification β of the image is calculated from a focal length f of the lens unit 200 and a subject distance L by the following equation.

$$\beta = f/(((L-2f)+((L-2f)^2-4f^2)^{1/2})/2)$$

Specifically, if it is assumed that a focal length f=100 mm, a subject distance L=500 mm to 510 mm, and change in lateral magnification of an image focused only by focus is observed, then the magnification varies from 0.382 times to 0.366 times. Now, the lateral magnification β of the image is corrected by zooming. For example, by setting a focal length f=102 mm, when a subject distance L=510 mm, the lateral magnification β of the image becomes 0.382 times, which is equal to 13 of the case where a subject distance L=500 mm.

If magnification changing by the zooming is not performed, in this example, the image size is different by as much as 4% in contemplation of a magnification ratio, and thus image composition will become complex as well as an image quality will be degraded. Note that in this case, short-distance-side depth of field ΔL will be changed at each focus position, so that it is better to use ΔL(L) calculated depending on a subject distance L.

The processing of FIG. 20 now will be described. Because the processing of FIG. 20 is similar to that in FIG. 15, only different parts will be described. The steps S51 to S54 in FIG. 20 is the same processing as that in FIG. 15, and the processing of the steps S57 to S60 identical to that in FIG. 15 is executed without carrying out the steps S55 and S56 in FIG. 15.

Also, in FIG. 20, after step S60, instead of executing the process of step S61 in FIG. 15, in step S91, the image processing portion 126 (or the Bucom 101) calculates a lateral magnification β of the image, thereafter moving a focus position by focusing to attain the lateral magnification β of the image by zooming in step S92.

After the process of step S92, the processes of steps S62 to S64 are executed in the same manner as in FIG. 15.

In step S93, following the processing of step S64, the focus position is moved by the focus lens 202a, and the lateral magnification β of the image is adjusted by zooming of the variable power lens 202b. After the processing of step S93, the processing of steps S66 and S67 is executed in the same manner as in FIG. 15.

After the processing of step S67, instead of the processing of step S68 in FIG. 15, in step S94, the Bucom 101 sets a subject distance L to the reference position information L0. Also, next, in step S95, the Bucom 101 executes the same processing as that of step S92. In step S96, following the step S95, the position detecting portion detects a subject distance L and in addition, the image processing portion 126 calculates ΔL.

After the processing of step S96, the processing of step S70 is executed in the same manner as in FIG. 15. In step S70, if L-L0 does not match with ΔL, then the processing returns to step S94. In contrast, if L-L0 matches with ΔL, then the processing proceeds to step S71.

Also, after step S71, the processing of steps S72 and S73 is performed, and if the 2nd release switch is not turned off in step S73, then the processing returns to step S96. In contrast, if the 2nd release switch is turned off, then the processing proceeds to step S74. The processing subsequent to step S74 is the same as that in FIG. 15.

According to the present modification, since the lateral magnification β of the image is adjusted to sequentially photograph a plurality of images, as in the second embodiment, a plurality of photographed images required to generate a high-quality and very-large-depth-of-field composite image can be obtained with a simple operation.

It should be noted that the processing shown in FIG. 16 is applied to the images photographed in the super-depth mode of FIG. 20, and thereby a high-quality and very-large-depth-of-field composite image can be generated.

In the description of the above-described embodiments and modification, although image photographing has been performed for each predetermined depth of field ΔL, a photographed image recording method may also be adopted for performing photographing until the 2nd release switch is turned off with a maximum number of continuous shooting frames of the camera systems 10 and 10B, thereafter extracting and recording an image for each short-distance-side depth of field ΔL.

In this case, each photographed image which is not recorded yet and focus position information (a subject distance L and the like) may be recorded in association with each other.

As described above, in the first or the second embodiments and the like, it has been explained that a very-large-depth-of-field composite image can be generated, but (like short-distance-side depth of field ΔL) if the number of photographed images recorded for each movement by a predetermined movement amount ΔL' within the range of the depth of field (or a total amount of movement of ΔL') is equal to or greater than a threshold, then the size of some of the plurality of photographed images may be corrected and a composite image may be generated. For example, the size correcting portion 126c (see FIG. 1) for correcting the size of a photographed image may be provided in the image processing portion 126. The size correcting portion 126c may also be provided in the image combining portion 126b. Alternatively, the size correcting portion 126c may be provided outside the image processing portion 126.

Specifically, if a cylindrical subject installed on, for example, a horizontal plane so as to form an angle with the Z axis direction is photographed while the camera system 10 or 10B is approaching the cylindrical subject, then each part of the cylinder is sequentially recorded as a photographed image for each predetermined movement amount ΔL'. In this manner, when the recorded photographed images are combined as described above, even if a value of the depth direction (Z direction) of each part of the cylinder (i.e., a distance) is changed, since a composite image in which the sizes of the respective cylinder parts are the same is obtained, the sizes of the photographed images are allowed to be corrected depending on values in the Z direction to generate a more natural composite image.

Specifically, size of a photographed image recorded firstly at a subject distance L and at a focal length f of the taking lens 202 is defined as reference size 1 without size correction (not limited to the case where the size of a first photographed image is reference size), and size of a photographed image recorded secondly is corrected to be an image formed as if a subject distance is L+ΔL' (i.e., corrected to size of 1-ΔL'/L).

Size of a second or later, for example, a j-th recorded photographed image is corrected so as to correspond to the case where subject distance L+(j−1)ΔL' (i.e., corrected to the size of 1−(j−1)ΔL'/L). If the number of photographed sheets is equal to or greater than a threshold Th, such size correction may be made, or if the number of photographed sheets is lower than the threshold Th, such size correction may not be made. Also, size correction may be made on a photographed image having (an absolute value of) a size correction amount equal to or greater than a threshold, and such size correction may not be made on a photographed image having a size correction amount lower than the threshold.

Further, if a composite image is generated, the user may also decide whether to carry out size correction. It should be noted that if the size correction is carried out, the correction is not limited to the case of the above-described values. For example, if size of a j-th recorded photographed image is corrected, with a correction parameter being k, correction may be made like this: 1−k(j−1)ΔL'/L. Here, k may be a range including 1, for example, about 0.5<k<2.

The respective steps of the process procedures in the above-described respective embodiments or modifications may be executed in changed order, may be executed at the same time, or may be executed in different order, unless such changes are contrary to the nature of the processing. Also, a variety of functions with the above-described Bucom 101 may be configured by hardware such as a dedicated electronic circuit and a device.

Also, an embodiment conceived by partially combining the above-described respective embodiments, modifications, and the like also belongs to the present invention.

What is claimed is:

1. An image pickup apparatus that allows for short-distance photographing, the apparatus comprising:
a photographing lens portion including a focus lens and a variable power lens;
an image pickup portion that converts an optical image of a subject obtained via the photographing lens portion into an image signal;
a movement determining portion that determines whether the image pickup apparatus itself is moving along an optical axis in a direction in which the image pickup apparatus moves toward the subject or in a direction in which the image pickup apparatus move away from the subject, in a state where the photographing lens portion is positioned to focus on the subject;

a recording portion that records images obtained by the image pickup portion;

a control portion that, when the movement determining portion has determined that the image pickup apparatus itself is moving in a focused state, causes the variable power lens of the photographing lens portion to move, causes the image pickup portion to continuously pick up images of a plurality of regions of the subject at a same magnification and causes the images picked up by the image pickup portion at the same magnification to be stored in the recording portion; and an image combining portion that cuts out an image area having a predetermined contrast from each of the plurality of images at the same magnification recorded in the recording portion and generates one composite image.

2. The image pickup apparatus according to claim 1, wherein the control portion causes the image pickup portion to continuously pick up images of the plurality of regions of the subject at a timing when a maximum contrast value is detected.

3. The image pickup apparatus according to claim 2, wherein the control portion causes the recording portion to store the images continuously picked up by the image pickup portion, and also record respective maximum contrast values when the images are continuously picked up.

4. The image pickup apparatus according to claim 1 further comprising a display portion that provides a display for guiding movement of the image pickup apparatus itself, when it is determined that the image pickup apparatus itself moved at the focused state.

5. The image pickup apparatus according to claim 1, wherein the movement determining portion includes at least one of an acceleration sensor and a determining portion that determines a change of the image signal.

6. The image pickup apparatus according to claim 1, wherein the control portion causes the recording portion to record the images obtained by the image pickup portion, each time the movement determining portion determines that the movement of the image pickup apparatus is within a depth of field of the photographing lens portion.

* * * * *